(12) United States Patent
Shike

(10) Patent No.: US 11,157,849 B2
(45) Date of Patent: Oct. 26, 2021

(54) CONSTRUCTION MANAGEMENT METHOD BASED ON A CURRENT LANDFORM AND A DESIGN LANDFORM OF A CONSTRUCTION SITE

(71) Applicant: Komatsu Ltd., Tokyo (JP)

(72) Inventor: Chikashi Shike, Tokyo (JP)

(73) Assignee: KOMATSU LTD., Tokyo (JP)

( * ) Notice: Subject to any disclaimer, the term of this patent is extended or adjusted under 35 U.S.C. 154(b) by 190 days.

(21) Appl. No.: 15/747,286

(22) PCT Filed: Oct. 5, 2016

(86) PCT No.: PCT/JP2016/079707
§ 371 (c)(1),
(2) Date: Jan. 24, 2018

(87) PCT Pub. No.: WO2017/061517
PCT Pub. Date: Apr. 13, 2017

(65) Prior Publication Data
US 2018/0218304 A1   Aug. 2, 2018

(30) Foreign Application Priority Data

Oct. 5, 2015  (JP) .............................. JP2015-198082

(51) Int. Cl.
*G06Q 10/06* (2012.01)
*G06Q 50/08* (2012.01)
(Continued)

(52) U.S. Cl.
CPC ... *G06Q 10/06313* (2013.01); *G06Q 10/0631* (2013.01); *G06Q 50/08* (2013.01); *E02F 9/2054* (2013.01); *E02F 9/261* (2013.01)

(58) Field of Classification Search
CPC .............................................. G06Q 10/06313
(Continued)

(56) References Cited

U.S. PATENT DOCUMENTS 5,819,190 A * 10/1998 Nakagami ............. E02F 9/2029
701/50
6,181,999 B1 * 1/2001 Yamamoto ............. E02F 3/844
172/4.5
(Continued)

FOREIGN PATENT DOCUMENTS

JP   09-268760 A   10/1997
JP   2002-157302 A   5/2002
(Continued)

OTHER PUBLICATIONS

Japan's Komatsu reveals how to maximise construction drones ConstructionWeekOnline.com Syndicate Media Inc. (Sep. 20, 2018) available at https://dialog.proquest.com/professional/docview/2110454603?accountid=131444 (Year: 2018).*
(Continued)

*Primary Examiner* — Folashade Anderson
(74) *Attorney, Agent, or Firm* — Locke Lord LLP

(57) ABSTRACT

A construction management system includes a construction amount data calculation unit configured to calculate, based on a current landform and a design landform of a construction site, construction amount data of the construction site, an original unit data acquisition unit configured to acquire original unit data indicating a specific condition of a work device that constructs the construction site, a construction plan data calculation unit configured to calculate, based on the construction amount data and the original unit data, a construction plan corresponding to a target construction period, and a construction cost required when construction is executed using the construction plan, and a construction plan data output unit configured to cause an output device to output the construction cost corresponding to the target construction period.

18 Claims, 22 Drawing Sheets

(51) Int. Cl.
*E02F 9/20* (2006.01)
*E02F 9/26* (2006.01)

(58) Field of Classification Search
USPC .......................................................... 705/7.23
See application file for complete search history.

(56) References Cited

U.S. PATENT DOCUMENTS

| | | | |
|---|---|---|---|
| 6,996,507 B1* | 2/2006 | Myr .................... | G06F 17/5004 |
| | | | 703/2 |
| 8,422,825 B1* | 4/2013 | Neophytou ............... | G06F 3/14 |
| | | | 382/294 |
| 9,218,789 B1* | 12/2015 | Lininger ................... | G09G 5/14 |
| 10,684,137 B2* | 6/2020 | Kean ........................ | G06F 16/51 |
| 2002/0059320 A1 | 5/2002 | Tamaru | |
| 2005/0171790 A1* | 8/2005 | Blackmon ............... | G06Q 10/06 |
| | | | 705/315 |
| 2005/0268245 A1* | 12/2005 | Gipps ..................... | G06F 30/18 |
| | | | 715/762 |
| 2006/0026101 A1* | 2/2006 | Ogura ..................... | E02F 9/26 |
| | | | 705/50 |
| 2006/0044307 A1* | 3/2006 | Song ...................... | G06Q 10/06 |
| | | | 345/419 |
| 2006/0070746 A1* | 4/2006 | Lumpkins ............... | E02F 3/844 |
| | | | 172/2 |
| 2007/0100760 A1 | 5/2007 | Dawson | |
| 2010/0217640 A1 | 8/2010 | Nichols | |
| 2011/0257816 A1* | 10/2011 | Song ..................... | E02F 9/2008 |
| | | | 701/2 |
| 2013/0261902 A1* | 10/2013 | Zhdanov ................ | G05G 9/047 |
| | | | 701/50 |
| 2014/0285375 A1* | 9/2014 | Crain ...................... | G01S 17/86 |
| | | | 342/25 A |
| 2016/0321763 A1* | 11/2016 | Shike ............... | G06Q 10/06313 |
| 2018/0137446 A1* | 5/2018 | Shike ..................... | G06Q 50/08 |
| 2018/0218301 A1* | 8/2018 | Shike ................. | G06Q 10/0637 |
| 2020/0293037 A1* | 9/2020 | Kauppinen ........... | H04W 4/029 |

FOREIGN PATENT DOCUMENTS

| | | |
|---|---|---|
| JP | 2002-188183 A | 7/2002 |
| JP | 2005-011058 A | 1/2005 |
| JP | 2010-073031 A | 4/2010 |
| JP | 2014-026548 A | 2/2014 |

OTHER PUBLICATIONS

The view from above: One of the most visual manifestations of new technology is a drone flying above a construction site, but the data they can now provide is where things get really impressive International Constructions?.4: 42. KHL Group Ltd. (May 2018) available at dialog, proquest (Year: 2018).*

Office Action dated Mar. 16, 2018, issued for the corresponding Australian patent application No. 2016336320.

International Search Report dated Nov. 15, 2016, issued for PCT/JP2016/079707.

* cited by examiner

FIG.14

| CONSTRUC-TION SITE | XX CITY, XX PREFECTURE | CONSTRUC-TION PERIOD | MONTH/DAY/2015 TO MONTH/DAY/2015 | | | | 704 |
|---|---|---|---|---|---|---|---|
| EARTH CUTTING SOIL AMOUNT(m³) | EARTH FILLING SOIL AMOUNT(m³) | EARTH FILLING COMPACTED AREA(m³) | EARTH CUTTING AREA(m³) | EARTH FILLING AREA(m³) | EARTH CUTTING CONSTRUCTION SECTION SLOPE AREA(m³) | EARTH FILLING CONSTRUCTION SECTION SLOPE AREA(m³) | |
| 21660.0 | 19198.0 | 1000.0 | 2000.0 | 1000.0 | 1000.0 | 2000.0 | |

*ON-SITE AVERAGE TRANSPORT DISTANCE(m)  [120]

*SURPLUS SOIL CONVEYANCE AVERAGE TRANSPORT DISTANCE(km)  [2.3]

*BOUGHT SOIL CONVEYANCE AVERAGE TRANSPORT DISTANCE(km)  [4.0]

*GROUND CONVERTED CONVEYED SOIL AMOUNT(m³)  [7000]

*CONVEYED SEDIMENT TYPE  [NORMAL ∨]

*EARTH CUTTING SEDIMENT TYPE  [NORMAL ∨]

*CUT EARTH DISPOSAL  PRESENT ○  ● ABSENT

*PROVISIONAL STORAGE PLACE  PRESENT ●  ○ ABSENT

*AVERAGE TRANSPORT DISTANCE FROM PROVISIONAL STORAGE PLACE(km)  [1.0]

*PROVISIONAL STORAGE PLACE STOPOVER  PRESENT ●  ○ ABSENT

FIG.19

RESULT DETAILS | CHANGE TRUCK | CHANGE MACHINE | CHANGE OTHER DEVICES | SITE MASTER | SELECT PAST RESULT | SAVE | END

704

COST: 20233 THOUSANDS  COMPLETION DAY: JULY 1, 2015(28 DAYS IN TOTAL) CONSTRUCTION PERIOD: 40 DAYS
NUMBER OF RAINY UNWORKABLE DAYS: 8
Pc200i×4  d30×4  REGULAR TRUCK×7  SCRAPING TRUCK×4

DAY | WEEK

|  | APRIL/2015 | | | | | | | | | | | | | | | MAY/2015 | | | | | | | | | | | | | | | | | | | | | | | | |
|---|24|25|26|27|28|29|30|1|2|3|4|5|6|7|8|9|10|11|12|13|14|15|16|17|18|19|20|21|22|23|24|25|26|27|28|29|30|31|1|2|3|4|5|6|7|8|
| EARTH CUTTING | | | | | | | | | | | | | | | | | | | | | | | | | | | | | | | | | | | | | | | | | | | | | | |
| HALF CUTTING | | | | | D | | | | | | | | | | | | | | | | | | | | | | | | | | | | | | | | | | | | | | | | | |
| EARTH FILLING | | | | | | | | | C | | | | | | | | | | | | | | | | | | | | | | | | | | | | | | | | | | | | | |
| SPREADING | | | | | | | | | | | | | | | | | | | | | | | | | | | | | | | | | | | | | | | | | | | | | | |
| SLOPE | | | | | | | | | | | | | | | | | | | | | | | | | | | | | | | | | | | | | | | | | | | | | | |

THIS TIME | | | PREVIOUS TIME

TRUCK         XXX YEN/PER DEVICE & DAY  * X DEVICES * X DAYS  = XXXX YEN      XXX YEN/PER DEVICE & DAY  * X DEVICES * X DAYS  = XXXX YEN
POWER SHOVEL  XXX YEN/PER DEVICE & DAY  * X DEVICES * X DAYS  = XXXX YEN      XXX YEN/PER DEVICE & DAY  * X DEVICES * X DAYS  = XXXX YEN
BULL          XXX YEN/PER DEVICE & DAY  * X DEVICES * X DAYS  = XXXX YEN      XXX YEN/PER DEVICE & DAY  * X DEVICES * X DAYS  = XXXX YEN
SUPERVISOR    XXX YEN/PER HEAD & DAY    * X HEADS            = XXXX YEN      XXX YEN/PER HEAD & DAY    * X HEADS            = XXXX YEN
OPERATOR      XXX YEN/PER HEAD & DAY    * X HEADS            = XXXX YEN      XXX YEN/PER HEAD & DAY    * X HEADS            = XXXX YEN
TOTAL                                                         XXXXX YEN                                                      XXXXX YEN

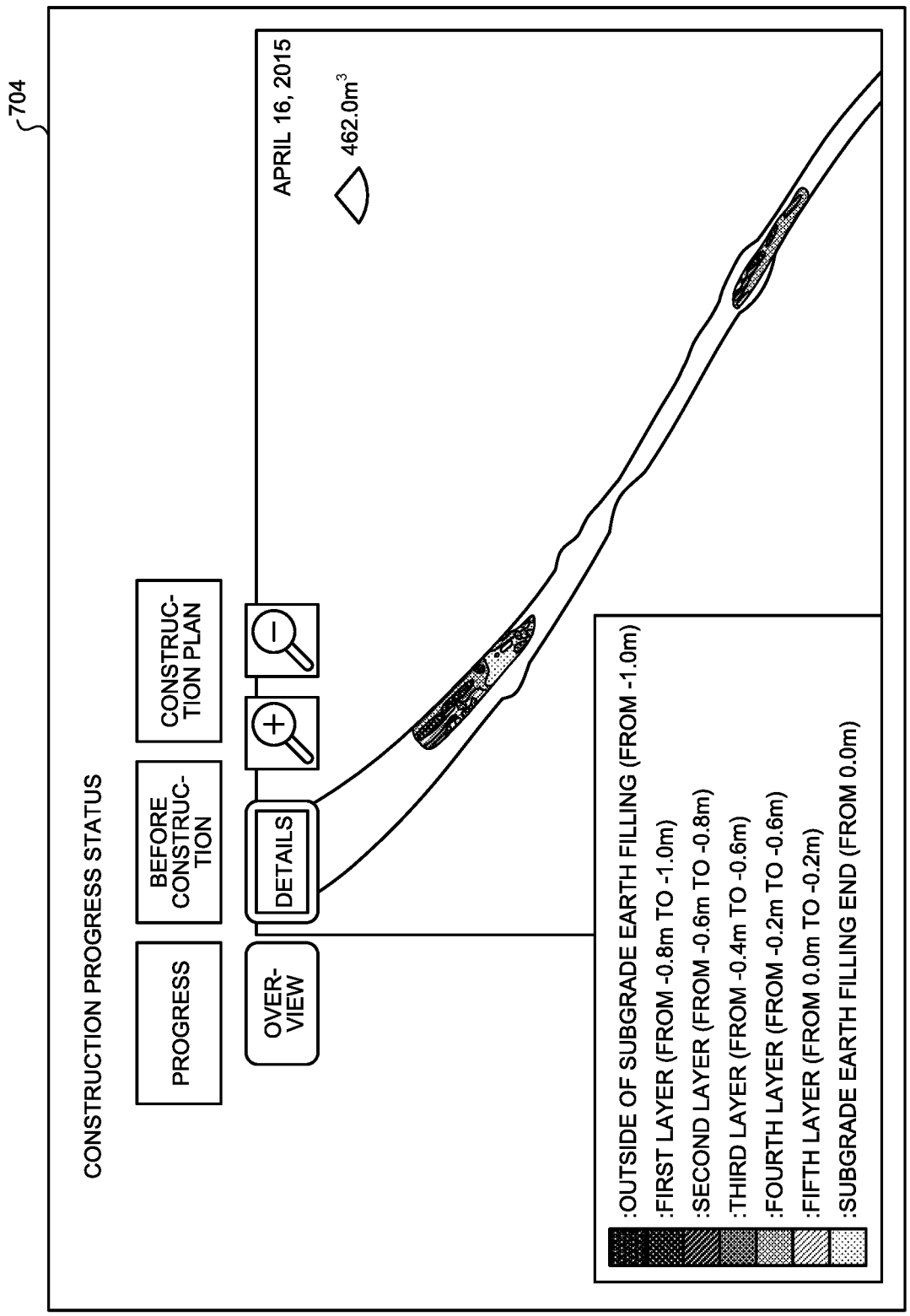

CONSTRUCTION MANAGEMENT METHOD BASED ON A CURRENT LANDFORM AND A DESIGN LANDFORM OF A CONSTRUCTION SITE

FIELD

The present invention relates to a construction management system and a construction management method.

BACKGROUND

In some cases, a work device operating in a construction site is managed by a computer system (refer to Patent Literature 1).

CITATION LIST

Patent Literature

Patent Literature 1: Japanese Patent Application Laid-open No. 2002-188183 A

SUMMARY

Technical Problem

Labor shortage in the construction industry is expected due to aging of workers in a construction site, and young people's disinclination for working in the construction industry. If an optimum construction solution service can be provided, productivity in the construction site can be enhanced, and labor shortage problems faced by the construction industry can be solved.

The object of an aspect of the present invention is to provide a construction management system and a construction management method that can achieve enhancement in productivity in a construction site.

Solution to Problem

According to a first aspect of the present invention, a construction management system comprises: a construction amount data calculation unit configured to calculate, based on a current landform and a design landform of a construction site, construction amount data of the construction site; an original unit data acquisition unit configured to acquire original unit data indicating a specific condition of a work device that constructs the construction site; a construction plan data calculation unit configured to calculate, based on the construction amount data and the original unit data, a construction plan corresponding to a target construction period, and a construction cost required when construction is executed using the construction plan; and a construction plan data output unit configured to cause an output device to output the construction cost corresponding to the target construction period.

According to a second aspect of the present invention, a construction management system comprising: a construction amount data calculation unit configured to calculate, based on a current landform and a design landform of a construction site, construction amount data of the construction site; an original unit data acquisition unit configured to acquire original unit data indicating a specific condition of a work device that constructs the construction site; a construction plan data calculation unit configured to calculate, based on the construction amount data and the original unit data, necessary work device data indicating a work device necessary for completing construction of the construction site within a target construction period; and a construction plan data output unit configured to cause an output device to output the target construction period and target construction amount data in a construction day of the target construction period.

According to a third aspect of the present invention, a construction management method comprising: calculating, based on a current landform and a design landform of a construction site, construction amount data of the construction site; calculating, based on the construction amount data, and original unit data indicating a specific condition of a work device that constructs the construction site, a construction plan corresponding to a target construction period, and a construction cost required when construction is executed using the construction plan; and causing an output device to output the construction cost corresponding to the target construction period.

According to a fourth aspect of the present invention, a construction management method comprising: calculating, based on a current landform and a design landform of a construction site, construction amount data of the construction site; calculating, based on the construction amount data, and original unit data indicating a specific condition of a work device that constructs the construction site, necessary work device data indicating a work device necessary for completing construction of the construction site within a target construction period; and causing an output device to output the target construction period and target construction amount data in a construction day of the target construction period.

Advantageous Effects of Invention

According to an aspect of the present invention, a construction management system and a construction management method that can achieve enhancement in productivity in a construction site are provided.

BRIEF DESCRIPTION OF DRAWINGS

FIG. 14 is a diagram illustrating an output example of the output device according to the present embodiment.

FIG. 19 is a diagram illustrating an output example of the output device according to the present embodiment.

FIG. 20 is a diagram illustrating an output example of the output device according to the present embodiment.

DESCRIPTION OF EMBODIMENTS

An embodiment according to the present invention will be described below with reference to the drawings. Nevertheless, the present invention is not limited to this. Components in the embodiment to be described below can be appropriately combined. In addition, a part of components are not used in some cases.

[Overview of Construction Management System]

Figure 1:
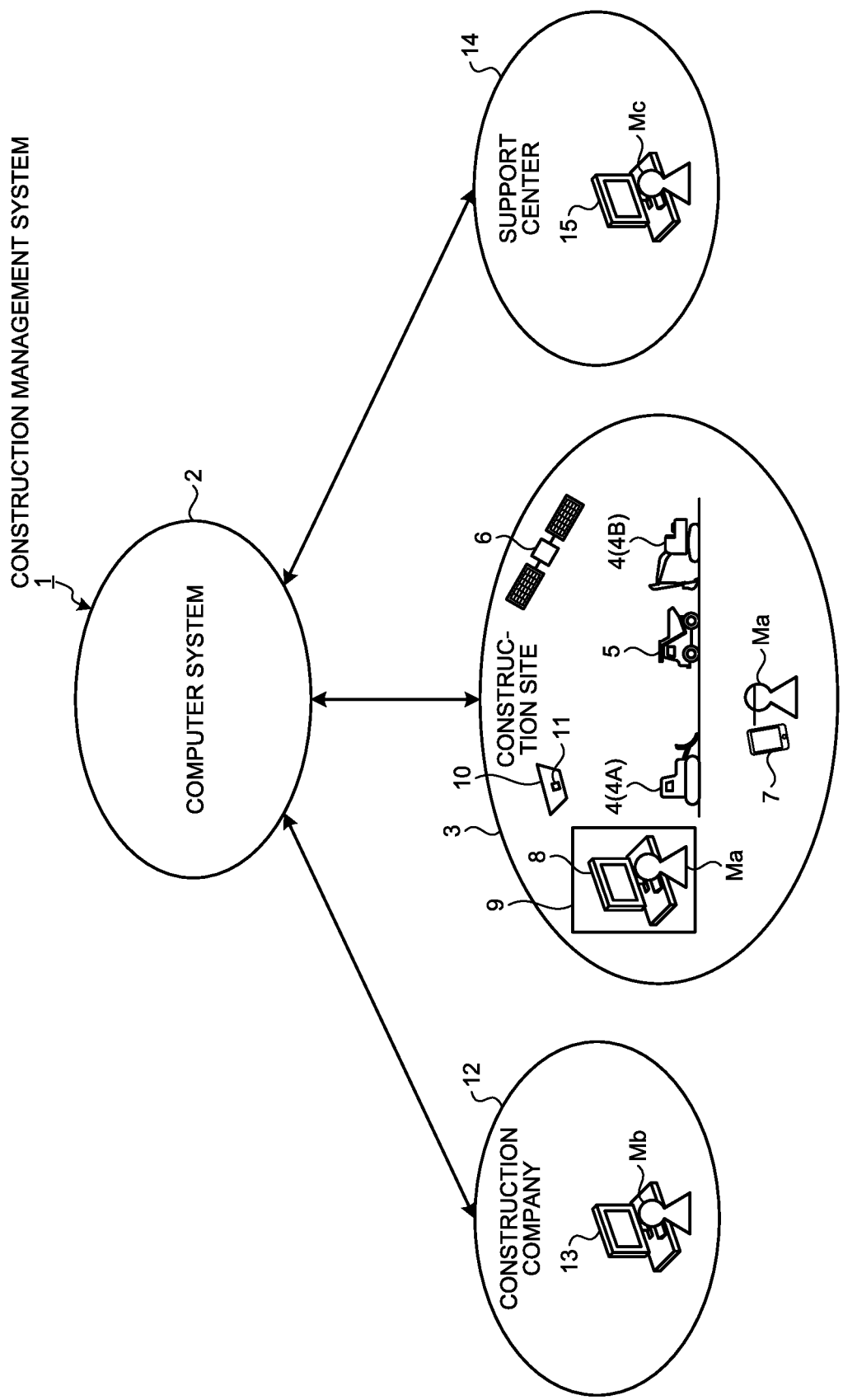
FIG. 1 is a diagram schematically illustrating a construction management system according to the present embodiment.

FIG. 1 is a diagram schematically illustrating construction management system 1 according to the present embodiment. The construction management system 1 executes one or both of derivation of a construction plan and visualization of progress statuses of construction. The construction management system 1 includes a computer system 2, and executes construction planning and construction management of a civil engineering construction site 3. In the construction site 3, a work device operates. The work device includes, for example, a construction machine 4 that can execute one of earth cutting, earth filling, and land preparation of the construction site 3, and a transporter vehicle 5 that can transport sediment.

The construction machine 4 is an information and communication technology (ICT) construction machine that can execute informatization construction. The informatization construction is a system that executes construction highly-efficiently and highly-accurately while paying attention to construction among construction processes including research, design, construction, supervision, testing, and maintenance management, by an information and communication technology (ICT), utilizing electronic data obtained from each process. In addition, by electronic data obtained in the construction, being utilized in another process, productivity enhancement and quality securement of the entire construction processes are achieved. With the work device that can execute informatization construction, movements of a work device can be automatically controlled, and a current landform can be constructed into a target landform.

The construction machine 4 includes a bulldozer 4A and an excavator 4B that have work members. The work members refer to members that have blade edges, and can perform earth cutting, earth filling, or land preparation of a current landform of the construction site 3. The work members include a blade provided on the bulldozer 4A, and a bucket provided on the excavator 4B. In the construction site 3, the bulldozer 4A performs excavation of sediment, earth cutting, earth dozing, earth filling, and land preparation. The excavator 4B performs excavation of sediment, earth cutting, earth filling, and land preparation.

The transporter vehicle 5 includes a dump truck having a vessel. Sediment is loaded onto the transporter vehicle 5 by the excavator 4B. For example, the transporter vehicle 5 transports sediment from the construction site 3 to the outside of the construction site 3, and transports sediment from the outside of the construction site 3 into the construction site 3.

An absolute position indicating a position of a vehicle main body of the construction machine 4 in a global coordinate system (XgYgZg-coordinate system) is detected by the Global Positioning System (GPS) including a GPS satellite 6. A relative position indicating a position of a blade edge of the work member with respect to the vehicle main body of the construction machine 4 in a local coordinate system (XYZ-coordinate system) is detected by a detection device provided in the construction machine 4. Based on the absolute position of the vehicle main body and the relative position between the vehicle main body and the blade edge of the work member, an absolute position of the blade edge of the work member is calculated.

In addition, in the construction site 3, a worker Ma performs works. The worker Ma includes at least either one of an operator of the construction machine 4 and a workman that performs a subsidiary work or the like in the construction site 3. The worker Ma has a mobile terminal 7. The mobile terminal 7 includes a mobile computer such as a smartphone or a tablet personal computer. In addition, a site office 9 is provided in the construction site 3. An information terminal 8 such as a personal computer is installed in the site office 9. The worker Ma performs works using the mobile terminal 7 or the information terminal 8.

In addition, in the construction site 3, a drone 10 for detecting a current landform of the construction site 3 operates. The drone 10 is a flight vehicle that flies without human. The drone 10 includes at least either one of a flight vehicle remotely-manipulated by wireless, and a flight vehicle that automatically ascends, flies according to a preset flight route, and descends to a predetermined position. The drone 10 includes a camera 11. In a state in which the camera 11 is mounted, the drone 10 flies above the construction site 3. The camera 11 is a detection device that can detect a current landform of the construction site 3 in a contactless manner. The camera 11 provided in the drone 10 aerially takes an image of the construction site 3, and detects a current landform in a contactless manner.

The construction management system 1 can perform data communication with a construction company 12. In the construction company 12, a design landform of the construction site 3 is created. The design landform is a target shape of a land surface in the construction site 3. An information terminal 13 such as a personal computer is installed in the construction company 12. A worker Mb of the construction company 12 creates two-dimensional or three-dimensional design landform data using the information terminal 13.

In addition, the construction management system 1 can perform data communication with a support center 14 that supports the construction site 3. In the support center 14, a change of a design landform or generation of three-dimensional image data that has been requested by the construction site 3 is performed. An information terminal 15 such as a personal computer is installed in the support center 14. A worker Mc of the support center 14 performs works using the information terminal 15. In addition, the construction management system 1 may be disposed in the support center 14, and processing of the construction management system 1 may be executed in the support center 14.

[Construction Machine]

Next, the construction machine 4 will be described. An absolute position indicating a position of a vehicle main body of the construction machine 4 in the global coordinate system (XgYgZg-coordinate system) is detected by the Global Positioning System (GPS) including the GPS satellite 6. A relative position indicating a position of a blade edge of the work member with respect to the vehicle main body of the construction machine 4 in the local coordinate system (XYZ-coordinate system) is detected by a detection device provided in the construction machine 4. Based on the absolute position of the vehicle main body and the relative position between the vehicle main body and the blade edge of the work member, an absolute position of the blade edge of the work member is calculated.

Figure 2:
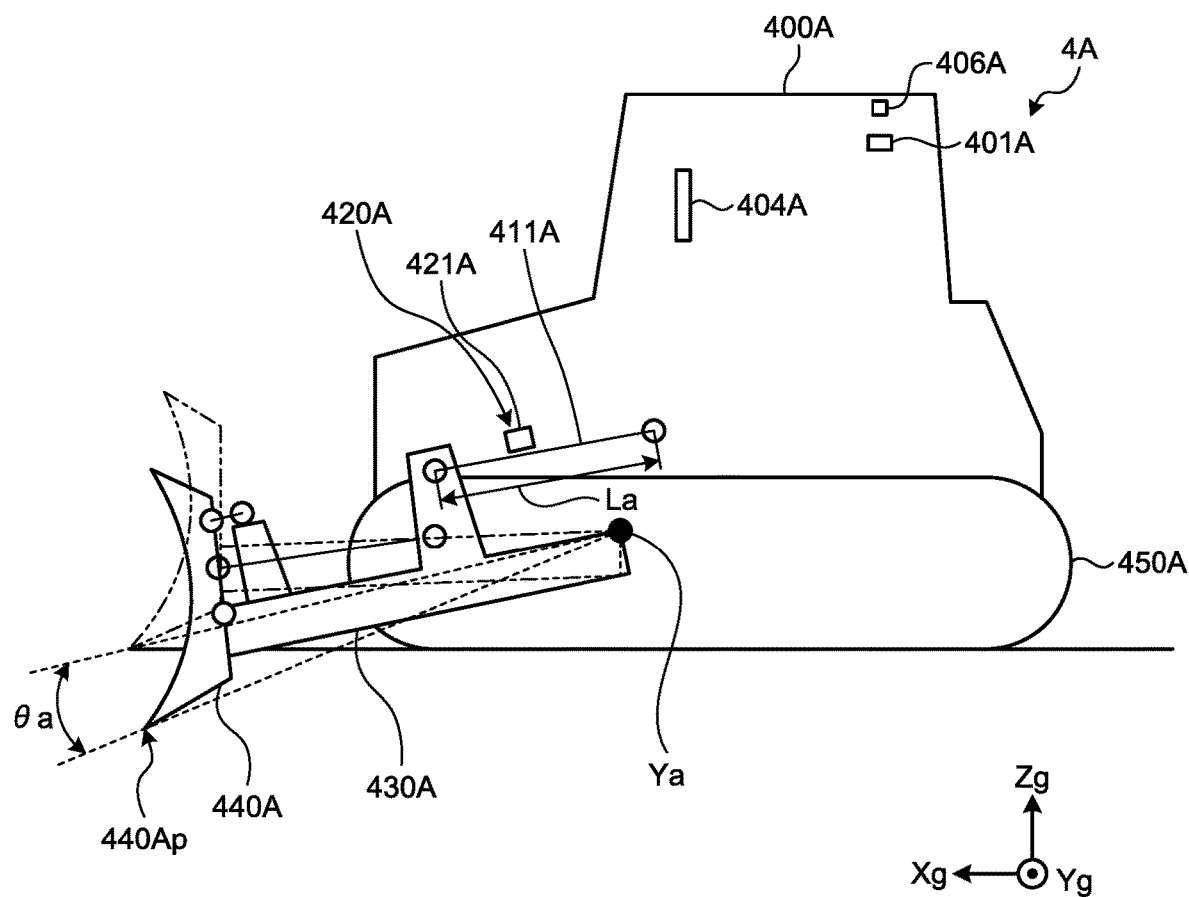
FIG. 2 is a diagram schematically illustrating a bulldozer according to the present embodiment.

FIG. 2 is a diagram schematically illustrating the bulldozer 4A. The bulldozer 4A includes a vehicle main body 400A, a GPS receiver 406A that detects an absolute position of the vehicle main body 400A, a detection device 420A that detects a relative position of a blade edge 440Ap of a blade 440A with respect to the vehicle main body 400A, and a blade control device 401A that controls the position of the blade edge 440Ap of the blade 440A.

In addition, the bulldozer 4A includes a lift cylinder 411A being a hydraulic cylinder, a lift cylinder sensor 421A that detects an operation amount of the lift cylinder 411A, a lift frame 430A that supports the blade 440A, and a travel apparatus 450A that supports the vehicle main body 400A.

The vehicle main body 400A includes a cab provided with a driver seat on which a driver is seated. In the cab, various operating devices and an output device 404A that displays image data are disposed.

The travel apparatus 450A includes a crawler. The lift frame 430A is supported on the vehicle main body 400A so as to be vertically operable around an axis line Ya being parallel to a vehicle width direction. The blade 440A is supported on the vehicle main body 400A via the lift frame 430A. The lift cylinder 411A is provided so as to connect the vehicle main body 400A and the lift frame 430A. The lift cylinder 411A moves the lift frame 430A, and moves the blade 440A vertically. The blade edge 440Ap is disposed at a lower end portion of the blade 440A. In a land preparation work and an earth cutting work (excavation work), the blade edge 440Ap contacts the land surface of the construction site 3.

The GPS receiver 406A is provided in the vehicle main body 400A. The vehicle main body 400A is provided with a GPS antenna. The GPS antenna outputs, to the GPS receiver 406A, a signal corresponding to radiowaves received from the GPS satellite 6. The GPS receiver 406A acquires absolute position data indicating an absolute position of an own vehicle. By the GPS receiver 406A acquiring the absolute position of the own vehicle, the absolute position data indicating the absolute position of the vehicle main body 400A is acquired.

The detection device 420A includes the lift cylinder sensor 421A. The lift cylinder sensor 421A detects lift cylinder length data La indicating a stroke length of the lift cylinder 411A. Based on the lift cylinder length data La, the blade control device 401A calculates a lift angle θa of a blade 404A. The lift angle θa corresponds to an angle of descent from an origin position of the blade 440A, that is, a depth of penetration into the ground of the blade edge 440Ap, or a height from the ground. In FIG. 2, origin positions of the lift frame 430A and the blade 440A are indicated by dashed-two dotted lines. If the lift frame 430A and the blade 440A are positioned at the origin positions, the blade edge 440Ap of the blade 440A contacts the land surface. By the bulldozer 4A moving forward in a state in which the blade 440A is lowered from the origin position, the land preparation work and the earth cutting work (excavation work) are performed by the bulldozer 4A.

In addition, the bulldozer 4A may include an angle cylinder that can move the blade 440A in a rotation direction (an angle direction), a tilt cylinder that can move the blade 440A in a rotation direction (tilt direction), an angle cylinder sensor that detects angle cylinder length data indicating a stroke length of the angle cylinder, and a tilt cylinder sensor that detects tilt cylinder length data indicating a stroke length of the tilt cylinder, which are not illustrated in the drawing.

In addition to the lift cylinder sensor 421A, the detection device 420A also includes an angle cylinder sensor and a tilt cylinder sensor. The lift cylinder length data detected by the lift cylinder sensor 421A, the angle cylinder length data detected by the angle cylinder sensor, and the tilt cylinder length data detected by the tilt cylinder sensor are output to the blade control device 401A. Based on the lift cylinder length data, the angle cylinder length data, and the tilt cylinder length data, the blade control device 401A calculates a relative position of the blade edge 440Ap of the blade 440A with respect to the vehicle main body 400A. Based on the calculated relative position of the blade edge 440Ap of the blade 440A with respect to the vehicle main body 400A, and the absolute position of the vehicle main body 400A acquired by the GPS receiver 406A, the blade control device 401A calculates an absolute position of the blade edge 440Ap of the blade 440A.

Figure 3:
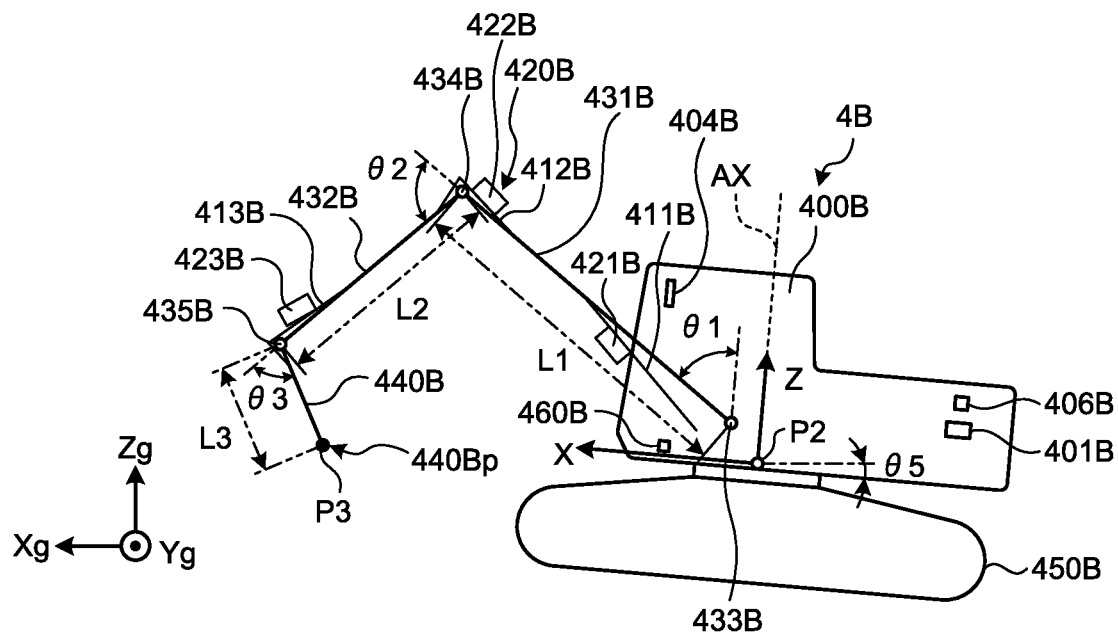
FIG. 3 is a diagram schematically illustrating an excavator according to the present embodiment.
Figure 4:
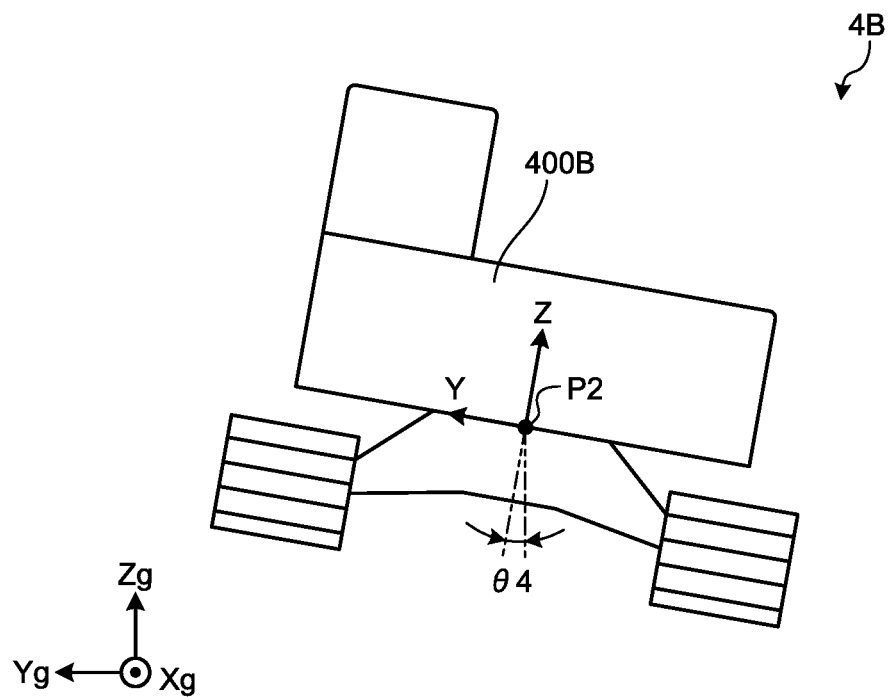
FIG. 4 is a diagram schematically illustrating the excavator according to the present embodiment.

FIGS. 3 and 4 are diagrams schematically illustrating the excavator 4B. The excavator 4B includes a vehicle main body 400B, a GPS receiver 406B that detects an absolute position of the vehicle main body 400B, a detection device 420B that detects a relative position of a blade edge 440Bp of a bucket 440B with respect to the vehicle main body 400B, and a bucket control device 401B that controls a position of the blade edge 440Bp of the bucket 440B.

In addition, the excavator 4B includes a boom 431B connected to the vehicle main body 400B via a boom pin 433B, and an arm 432B connected to the boom 431B via an arm pin 434B. The bucket 440B is connected to the arm 432B via a bucket pin 435B.

In addition, the excavator 4B includes a boom cylinder 411B that drives the boom 431B, an arm cylinder 412B that drives the arm 432B, a bucket cylinder 413B that drives the bucket 440B, a boom cylinder stroke sensor 421B that detects an operation amount of the boom cylinder 411B, an arm cylinder stroke sensor 422B that detects an operation amount of the arm cylinder 412B, and a bucket cylinder stroke sensor 423B that detects an operation amount of the bucket cylinder 413B. The boom cylinder 411B, the arm cylinder 412B, and the bucket cylinder 413B are hydraulic cylinders.

In addition, the excavator 4B includes a travel apparatus 450B that supports the vehicle main body 400B, and an inertial measurement unit (IMU) 460B. The vehicle main body 400B is supported by the travel apparatus 450B. The vehicle main body 400B is an upper swing body that can swing around a swing axis AX. In addition, a point P2 indicated in FIGS. 3 and 4 is a point on the swing axis AX, and indicates an origin of the local coordinate system (XYZ-coordinate system).

The vehicle main body 400B includes a cab provided with a driver seat on which a driver is seated. In the cab, various operating devices and an output device 404B that displays image data are disposed.

The travel apparatus 450B includes a crawler. The blade edge 440Bp is disposed at a lower end portion of the bucket 440B. In the land preparation work and the earth cutting work (excavation work), the blade edge 440Bp contacts the land surface of the construction site 3.

The GPS receiver 406B is provided in the vehicle main body 400B. The vehicle main body 400B is provided with a GPS antenna. The GPS antenna outputs, to the GPS receiver 406B, a signal corresponding to radiowaves received from the GPS satellite 6. The GPS receiver 406B acquires absolute position data indicating an absolute position of an own vehicle. By the GPS receiver 406B acquiring the absolute position of the own vehicle, the absolute position data indicating the absolute position of the vehicle main body 400B is acquired.

The detection device 420B includes the boom cylinder stroke sensor 421B, the arm cylinder stroke sensor 422B, and the bucket cylinder stroke sensor 423B. The boom cylinder stroke sensor 421B detects boom cylinder length data indicating a stroke length of the boom cylinder 411B. The arm cylinder stroke sensor 422B detects arm cylinder length data indicating a stroke length of the arm cylinder 412B. The bucket cylinder stroke sensor 423B detects bucket cylinder length data indicating a stroke length of the bucket cylinder 413B.

Based on the boom cylinder length data, the bucket control device 401B calculates an inclination angle $\theta 1$ of the boom 431B with respect to a perpendicular direction of the vehicle main body 400B. Based on the arm cylinder length data, the bucket control device 401B calculates an inclination angle $\theta 2$ of the arm 432B with respect to the boom 431B. Based on the bucket cylinder length data, the bucket control device 401B calculates an inclination angle $\theta 3$ of the blade edge 440Bp of the bucket 440B with respect to the arm 432B. Based on the inclination angle $\theta 1$, the inclination angle $\theta 2$, the inclination angle $\theta 3$, a length L1 of the boom 431B, a length L2 of the arm 432B, and a length L3 of the bucket 440B, the bucket control device 401B calculates a relative position of the blade edge 440Bp of the bucket 440B with respect to the vehicle main body 400B. In addition, the length L1 of the boom 431B is a distance between the boom pin 433B and the arm pin 434B. The length L2 of the arm 432B is a distance between the arm pin 434B and the bucket pin 435B. The length L3 of the bucket 440 is a distance between the bucket pin 435B and the blade edge 440Bp of the bucket 440B.

The IMU 460B is provided in the vehicle main body 400B. The IMU 460B detects an inclination angle $\theta 4$ with respect to a left-right direction of the vehicle main body 400B, and an inclination angle $\theta 5$ with respect to a front-back direction of the vehicle main body 400B.

Based on the calculated relative position of the blade edge 440Bp of the bucket 440B with respect to the vehicle main body 400B, and the absolute position of the vehicle main body 400B that has been acquired by the GPS receiver 406B and the IMU 460B, the bucket control device 401B calculates an absolute position of the blade edge 440Bp of the bucket 440B.

Figure 5:
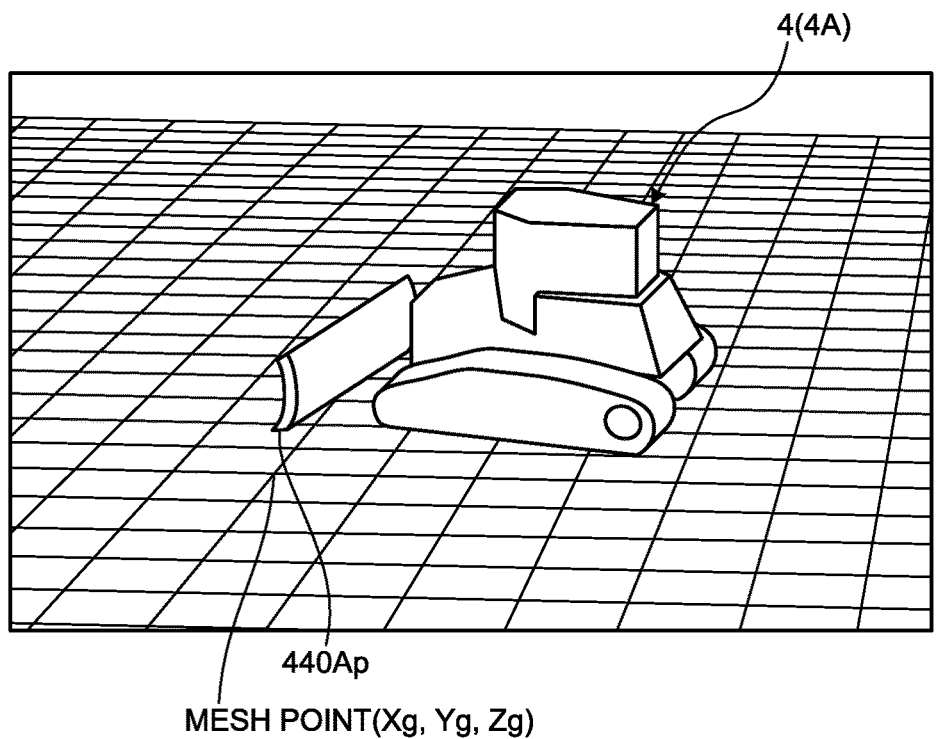
FIG. 5 is a diagram schematically illustrating informatization construction according to the present embodiment.
Figure 6:
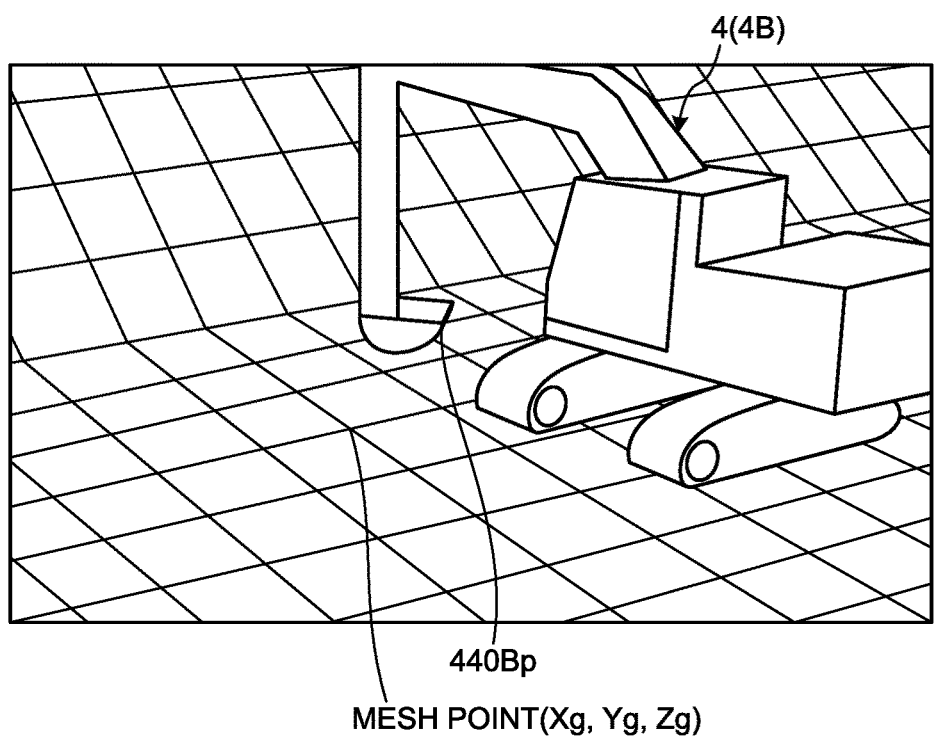
FIG. 6 is a diagram schematically illustrating informatization construction according to the present embodiment.

The construction machine 4 can acquire current landform data indicating a current landform of the land surface of the construction site 3. FIG. 5 is a schematic diagram illustrating a state in which the bulldozer 4A acquires current landform data, and FIG. 6 is a schematic diagram illustrating a state in which the excavator 4B acquires current landform data. As illustrated in FIG. 5, meshes are set in the current landform of the land surface of the construction site 3. The bulldozer 4A can detect an absolute position (a position in an Xg-axis direction, a position in a Yg-axis direction, and a position in a Zg-axis direction) of the blade edge 440Ap. By bringing the blade edge 440Ap into contact with a mesh point indicating an intersection point of meshes, the bulldozer 4A can acquire position data of each of a plurality of mesh points. Similarly, as illustrated in FIG. 6, by bringing the blade edge 440Bp into contact with a mesh point indicating an intersection point of meshes, the excavator 4B can acquire position data of each of a plurality of mesh points. By position data of a plurality of mesh points, that is, a trajectory of a blade edge 440$p$ (the blade edge 440Ap, the blade edge 440Bp) being acquired, the current landform data of the construction site 3 is acquired. In addition, if the bulldozer 4A or the excavator 4B travels while driving a crawler track included in a travel apparatus 450 (450A, 450B), based on dimension information of a vehicle body, and absolute position data indicating an absolute position of an own vehicle that is obtained by a GPS receiver 406 (406A, 406B), a trajectory of positions at which the crawler track has contacted the land surface during the traveling (travel trajectory of crawler track) may be obtained, and the travel trajectory of the crawler track may be acquired as current landform data of the construction site 3.

In this manner, an absolute position of a vehicle main body 400 (the vehicle main body 400A, the vehicle main body 400B) of the construction machine 4 (the bulldozer 4A, the excavator 4B) is detected by the GPS receiver 406 (406A, 406B) mounted in the vehicle main body 400, and the GPS including the GPS satellite 6. In addition, the construction machine 4 includes a detection device 420 (the detection device 420A, the detection device 420B) that can detect a relative position of the blade edge 440$p$ (the blade edge 440Ap, the blade edge 440Bp) of a work member 440 (the blade 440A, the bucket 440B) with respect to the vehicle main body 400. Based on the absolute position of the vehicle main body 400, and the relative position of the work member 440 with respect to the vehicle main body 400, the construction machine 4 can obtain an absolute position of the work member 440. The construction machine 4 can perform data communication with the computer system 2. The design landform data is transmitted from the computer system 2 to the construction machine 4. Based on the design landform data being a target shape of an excavation target, the construction machine 4 controls the work member 440 so that the blade edge 440$p$ of the work member 440 moves in accordance with the design landform.

In addition, the construction machine 4 can acquire current landform data of the construction site 3 using the blade edge 440$p$. In addition, the construction machine 4 can acquire construction result data based on the absolute position of the blade edge 440$p$ of the work member 440 during a work. The current landform data or the construction result data that has been acquired by the construction machine 4 is transmitted to the computer system 2.

[Drone]

Figure 7:
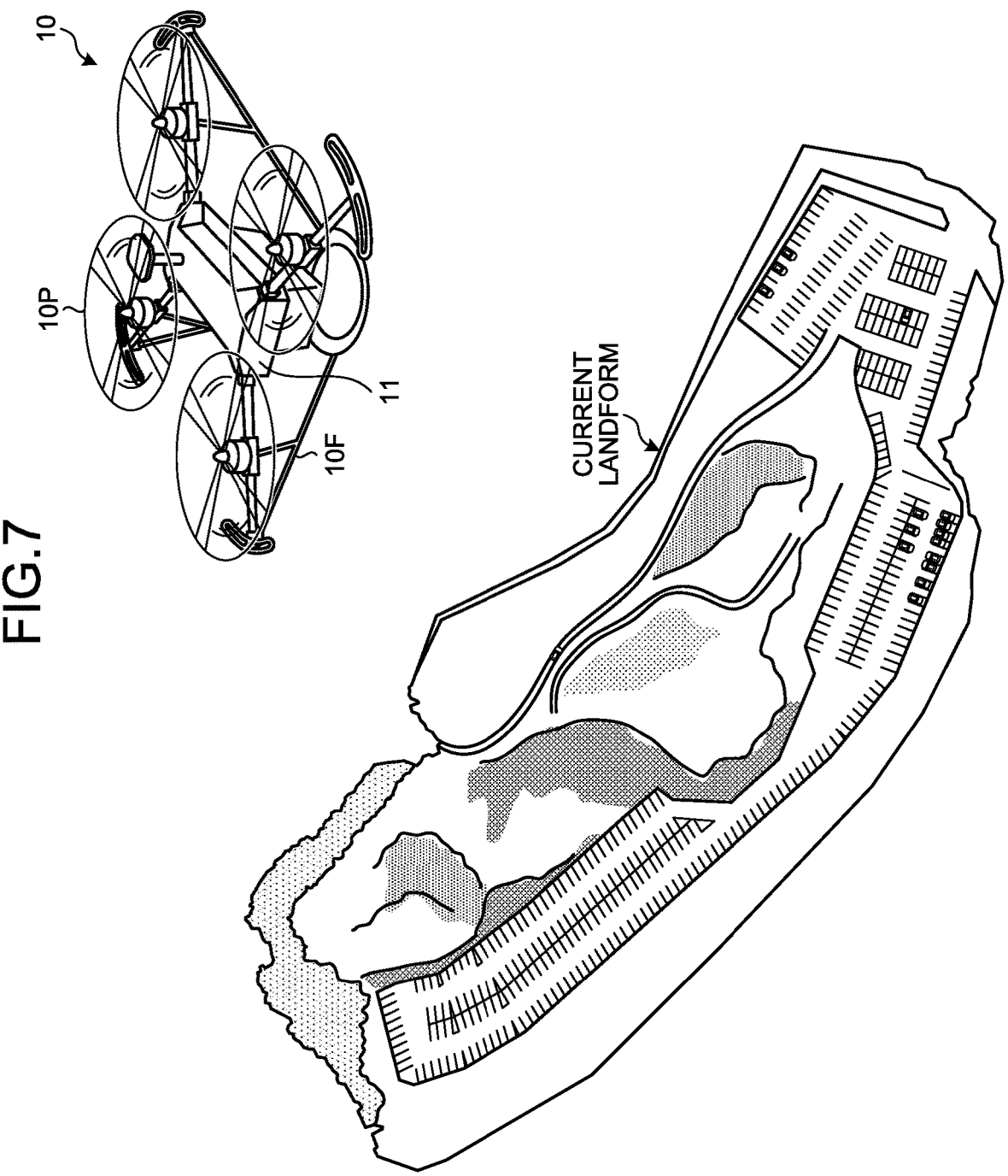
FIG. 7 is a diagram illustrating an acquisition method of current landform data according to the present embodiment.

FIG. 7 is a diagram schematically illustrating the drone 10. The drone 10 is an unmanned air vehicle that can fly above the construction site 3. Measurement of the construction site 3 is performed by the drone 10. The drone 10 is an uninhabited helicopter including a propeller 10P. The drone 10 includes a frame member 10F, the camera 11 supported on the frame member 10F, and the propeller 10P provided on the frame member 10F. By the propeller 10P rotating, the drone 10 flies. The drone 10 may be a flight vehicle that automatically flies in accordance with a flight route while comparing a predetermined flight route and a current position of itself, or may be a flight vehicle that is remotely-manipulated according to a radio signal from a radio manipulation device held by a manipulator on the ground, and flies on a flight route intended by the manipulator. An image of a current landform of the construction site 3 is aerially taken by the camera 11 of the drone 10. Image data of the current landform that has been acquired by the camera 11 is stored in a storage device 102 to be described later. The image data stored in the storage device 102 is downloaded from the storage device 102 onto a computer on the ground in a wireless or wired manner. The image data downloaded onto the computer is converted by conversion software installed on the computer, into three-dimensional current landform data indicating a current landform of the construction site 3. The three-dimensional current landform data is thereby acquired. In addition, conversion software may be stored in the storage device 102 of the drone 10, and three-dimensional current landform data may be generated by a processor 101 included in the drone 10.

[Hardware Configuration]

Figure 8:
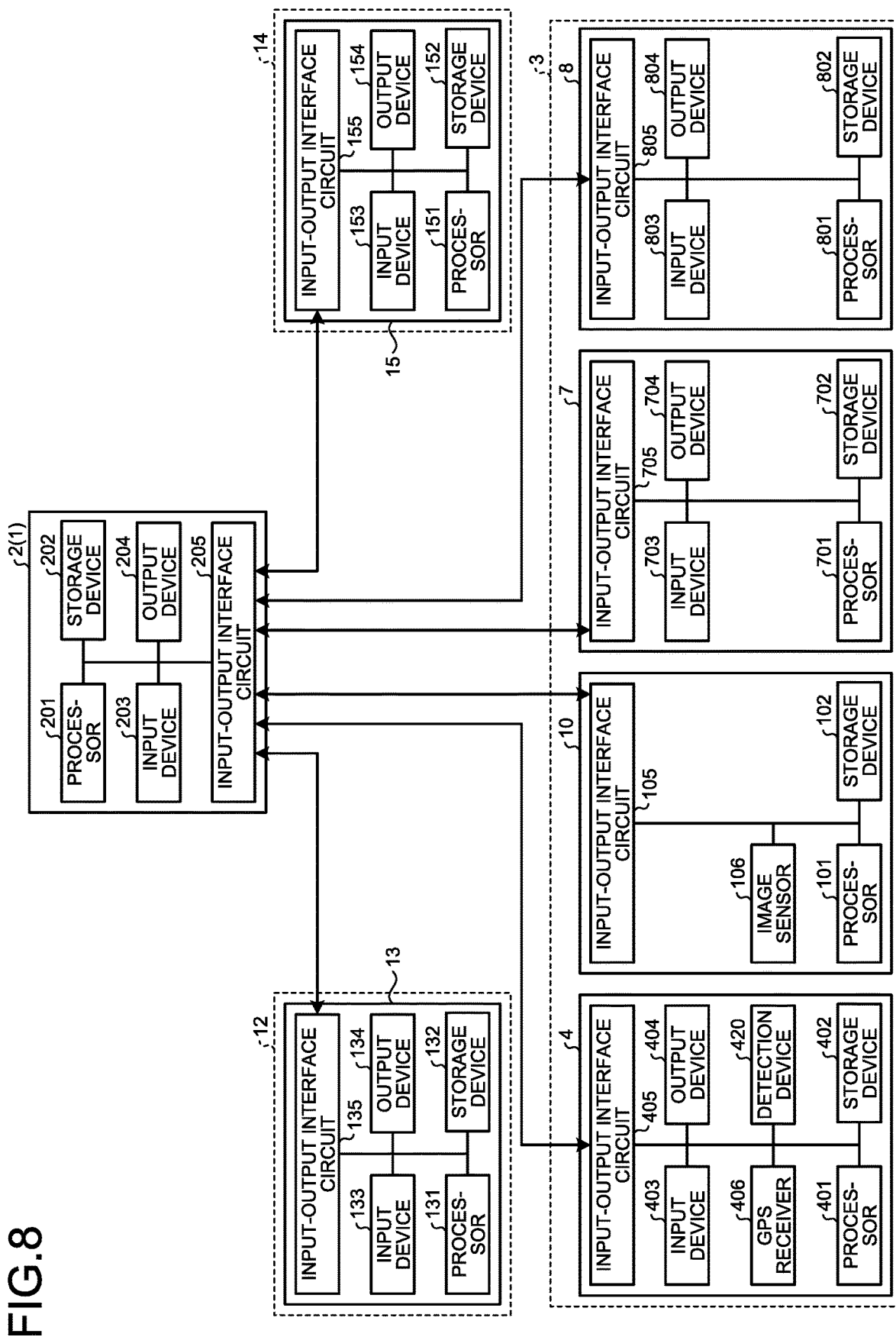
FIG. 8 is a diagram illustrating a hardware configuration of the construction management system according to the present embodiment.

FIG. 8 is a diagram illustrating a hardware configuration of the construction management system 1. The computer system 2 of the construction management system 1 includes a processor 201 such as a central processing unit (CPU), a storage device 202 including an internal memory such as a read only memory (ROM) or a random access memory (RAM), and an external memory such as a hard disc device, an input device 203 including an input device such as a keyboard, a mouse, and a touch panel, an output device 204 including a display device such as a flat-panel display device, and a printing device such as an ink-jet printer, and an input-output interface circuit 205 including a wired communication device or a wireless communication device.

The information terminal 13 installed in the construction company 12 includes a processor 131, a storage device 132, an input device 133, an output device 134, and an input-output interface circuit 135 including a wired communication device or a wireless communication device.

The construction machine 4 operating in the construction site 3 includes a processor 401, a storage device 402, an input device 403, an output device 404, the GPS receiver 406, the detection device 420, and an input-output interface circuit 405 including a wired communication device or a wireless communication device.

The drone 10 operating in the construction site 3 includes the processor 101, the storage device 102, an image sensor 106 of the camera 11, and an input-output interface circuit 105 including a wired communication device or a wireless communication device.

The mobile terminal 7 used in the construction site 3 includes a processor 701, a storage device 702, an input device 703, an output device 704, and an input-output interface circuit 705 including a wired communication device or a wireless communication device.

The information terminal 8 installed in the construction site 3 includes a processor 801, a storage device 802, an input device 803, an output device 804, and an input-output interface circuit 805 including a wired communication device or a wireless communication device.

The information terminal 15 installed in a service center 14 includes a processor 151, a storage device 152, an input device 153, an output device 154, and an input-output interface circuit 155 including a wired communication device or a wireless communication device.

The computer system 2 can perform data communication with the construction machine 4 in the construction site 3, the transporter vehicle 5, the mobile terminal 7, the information terminal 8, and the drone 10. The mobile terminal 7 and the information terminal 8 perform data communication with the computer system 2 via the internet. The construction machine 4, the transporter vehicle 5, and the drone 10 wirelessly perform data communication with the computer system 2 via a communication satellite line or a mobile phone line. In addition, the construction machine 4, the transporter vehicle 5, and the drone 10 may wirelessly perform data communication with the computer system 2 using another communication form such as a wireless local area network (LAN) including Wi-Fi.

In addition, the computer system 2 performs data communication with the information terminal 13 of the construction company 12 via the internet. The computer system 2 performs data communication with the information terminal 15 of the support center 14 via the internet.

[Computer System]

Figure 9:
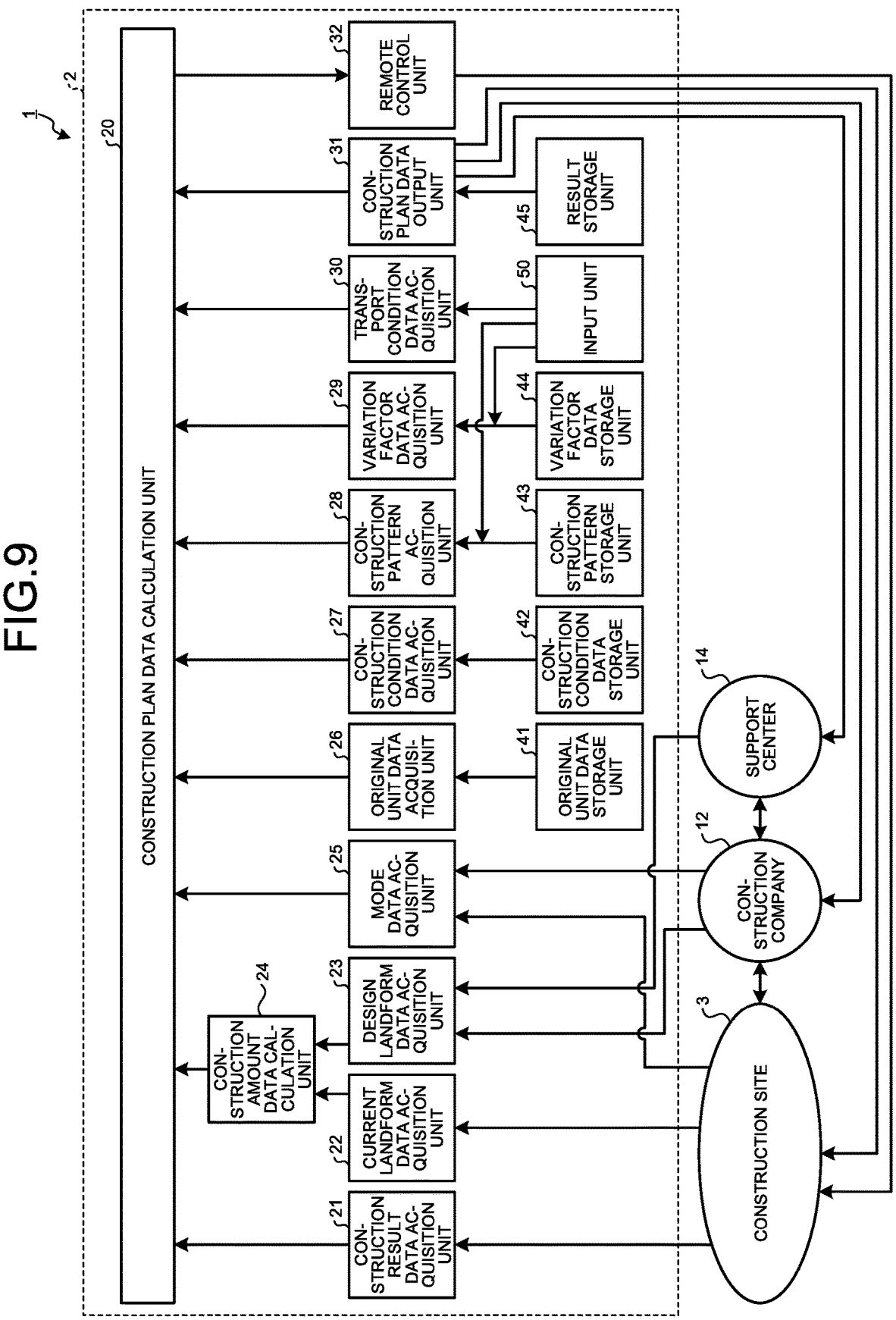
FIG. 9 is a functional block diagram illustrating the construction management system according to the present embodiment.

FIG. 9 is a functional block diagram illustrating the construction management system 1. The computer system 2 of the construction management system 1 includes a construction plan data calculation unit 20, a construction result data acquisition unit 21, a current landform data acquisition unit 22, a design landform data acquisition unit 23, a construction amount data calculation unit 24, a mode data acquisition unit 25, an original unit data acquisition unit 26, a construction condition data acquisition unit 27, a construction pattern acquisition unit 28, a variation factor data acquisition unit 29, a transport condition data acquisition unit 30, a construction plan data output unit 31, and a remote control unit 32.

In addition, the computer system 2 includes an original unit data storage unit 41, a construction condition data storage unit 42, a construction pattern storage unit 43, a variation factor data storage unit 44, and a result storage unit 45.

In addition, the computer system 2 includes an input unit 50 that generates, by being manipulated, an input signal corresponding to the manipulation.

The processor 201 handles functions of the construction plan data calculation unit 20, the construction result data acquisition unit 21, the current landform data acquisition unit 22, the design landform data acquisition unit 23, a construction amount data acquisition unit 24, the mode data acquisition unit 25, the original unit data acquisition unit 26, the construction condition data acquisition unit 27, the construction pattern acquisition unit 28, the variation factor data acquisition unit 29, the transport condition data acquisition unit 30, the construction plan data output unit 31, and the remote control unit 32.

The storage device 202 handles functions of the original unit data storage unit 41, the construction condition data storage unit 42, the construction pattern storage unit 43, the variation factor data storage unit 44, and the result storage unit 45.

The input device 203 handles a function of the input unit 50.

<Construction Result Data Acquisition Unit>

The construction result data acquisition unit 21 acquires construction result data indicating a construction result of the construction site 3. The construction result data is data indicating a result of construction executed by the construction machine 4. The construction machine 4 acquires construction result data of itself. Based on a trajectory of the absolute position of the blade edge 440p of the work member 440 that contacts the current landform, or a travel trajectory of the crawler, the construction machine 4 can detect the current landform. The construction machine 4 can compare the current landform detected from the absolute position of the blade edge 440p, and the design landform being a target shape, and acquire construction result data indicating how much a work (earth cutting or earth filling of sediment) has progressed with respect to the design landform. The construction result data acquisition unit 21 wirelessly acquires the construction result data from the construction machine 4. In addition, the computer system 2 may acquire construction result data by acquiring current landform data from the construction machine 4, and comparing the current landform and the design landform.

<Current Landform Data Acquisition Unit>

The current landform data acquisition unit 22 acquires current landform data indicating a current landform of the construction site 3. The current landform data is detected by the camera 11 provided in the drone 10. The current landform data acquisition unit 22 acquires the current landform data wirelessly, for example, from the camera 11 of the drone 10.

<Design Landform Data Acquisition Unit>

The design landform data acquisition unit 23 acquires design landform data indicating a design landform of the construction site 3. The design landform is created in the construction company 12. The design landform data acquisition unit 23 acquires the design landform data from the information terminal 13 of the construction company 12 via the internet. In addition, the design landform may be created in the support center 14. The design landform data acquisition unit 23 may acquire the design landform data from the information terminal 15 of the support center 14 via the internet.

<Construction Amount Data Calculation Unit>

Based on the current landform of the construction site 3 that has been acquired by the current landform data acquisition unit 22, and the design landform of the construction site 3 that has been acquired by the design landform data acquisition unit 23, the construction amount data calculation unit 24 calculates construction range data and construction amount data of the construction site 3.

The construction range refers to a range in which the current landform needs to be changed based on the design landform data. The construction range data is data indicating a range requiring construction that is derived from a difference between the current landform data and the design landform data. The construction range data includes earth cutting portion data indicating a portion requiring earth cutting (excavation) of sediment in the construction range, and earth filling portion data indicating a portion requiring earth filling (charging) of sediment in the construction range.

The construction amount is a collective term of an earth cutting amount and an earth filling amount in the construction range. In the present embodiment, the construction amount refers to a summation of the earth cutting amount or the earth filling amount. The construction amount data is a collective term of earth cutting amount data and earth filling amount data.

The earth cutting amount refers to an excavation amount of sediment to be excavated in the construction range. The earth cutting amount data is data indicating an earth cutting amount of sediment in the construction range.

The earth cutting amount data includes at least either one of earth cutting numerical data indicating an earth cutting amount of sediment using a numerical value, and earth cutting image data indicating an earth cutting amount of sediment using an image (icon or animation).

The earth filling amount refers to a charge amount of sediment to be input into the construction range. The earth filling amount data is data indicating an earth filling amount of sediment in the construction range. The earth filling amount data includes at least either one of earth filling numerical data indicating an earth filling amount of sediment using a numerical value, and earth cutting image data indicating an earth filling amount of sediment using an image (icon or animation).

<Mode Data Acquisition Unit>

The mode data acquisition unit 25 acquires mode data indicating a prioritized item of construction. The prioritized item of construction is selected by the worker Ma of the construction site 3 or the worker Mb of the construction company 12. The worker Ma inputs a prioritized item of construction by manipulating the input device 703 of the mobile terminal 7 or the input device 803 of the information terminal 8. The worker Mb inputs a prioritized item of construction by manipulating the input device 133 of the information terminal 13. The mode data acquisition unit 25 acquires mode data indicating a prioritized item of construction, via the internet, for example, from at least one of the mobile terminal 7, the information terminal 8, and the information terminal 13.

The mode data includes at least either one of construction period prioritizing mode data that prioritizes a period of construction, and cost prioritizing mode data that prioritizes a cost of construction. If construction is desired to be ended early, the worker Ma or the worker Mb selects a construction period as a prioritized item of construction, and manipulates the input device 703, the input device 803, or the input device 133. By the input device being manipulated, the construction period prioritizing mode data that prioritizes a period of construction is acquired by the mode data acquisition unit 25. On the other hand, construction is desired to be performed at low cost, the worker Ma or the worker Mb selects a cost as a prioritized item of construction, and manipulates an input device. By the input device being manipulated, the cost prioritizing mode data that prioritizes a cost of construction is acquired by the mode data acquisition unit 25.

<Original Unit Data Acquisition Unit>

The original unit data acquisition unit 26 acquires original unit data indicating a specific condition of a work device that constructs the construction site 3. The original unit data is stored in the original unit data storage unit 41. The original unit data acquisition unit 26 acquires the original unit data from the original unit data storage unit 41.

The specific condition of a work device in the original unit data includes at least one of a type and a vehicle rank of the work device that can be procured to the construction site 3, and the number of work devices. In addition, the specific condition of a work device includes a management state of a work device that can be procured.

In addition, the specific condition of a work device in the original unit data includes a work amount of the work device that can be executed per unit time. The work amount of the work device that can be executed per unit time is an index indicating work ability of the work device, and refers to an amount of sediment that can be moved by the work device per unit time. The work amount of the work device that can be executed per unit time is also referred to as a construction machine work original unit. If the work device is the bulldozer 4A, a work amount of the bulldozer 4A refers to an earth dozing amount (an amount of sediment that can be dozed) and an earth filling amount (an amount of sediment that can be banked) that can be executed by the bulldozer 4A per unit time. If the work device is the excavator 4B, a work amount of the excavator 4B refers to a loading amount (an amount that can be loaded onto the transporter vehicle 5), an earth cutting amount (amount that can be excavated), and an earth filling amount (an amount of sediment that can be banked) that can be executed by the excavator 4B per unit time. If the work device is the transporter vehicle 5, a work amount of the transporter vehicle 5 refers to an amount of sediment that can be transported by the transporter vehicle 5 per unit time.

A work amount of the construction machine 4 that can be executed per unit time depends on a size of the work member 440. If the size of the work member 440 is large, the work amount becomes larger, and if the size of the work member 440 is small, the work amount becomes smaller. Thus, the work amount of a work device 4 includes the size of the work member 440. The work amount of the bulldozer 4A includes a size of the blade 440A, and the work amount of the excavator 4B includes a size (bucket capacity) of the bucket 440B.

In addition, the original unit data further includes a specific condition of the worker Ma of the construction site 3. The condition of the worker Ma includes the number of workers Ma that can be procured for the construction site 3. In addition, the specific condition of the worker Ma includes skills of the workers Ma that can be procured.

In other words, the original unit data includes data indicating resources necessary for construction, such as a specific condition of a work device and a specific condition of workers. The original unit data is known data that can be acquired before construction, and is held in the original unit data storage unit 41.

<Construction Condition Data Acquisition Unit>

The construction condition data acquisition unit 27 acquires construction condition data indicating a construction condition of the construction site 3. The construction condition includes items set in the construction company 12. The construction condition data is stored in the construction condition data storage unit 42. The construction condition data acquisition unit 27 acquires the construction condition data from the construction condition data storage unit 42.

The construction condition data includes at least one of a budget related to construction, a construction period, work content, a work procedure, a work time, and a site environment. The site environment includes at least one of a landform of the construction site 3, and a size of the construction site 3. The construction condition data is known data set before construction, and is held in the construction condition data storage unit 42.

<Construction Pattern Acquisition Unit>

The construction pattern acquisition unit 28 acquires a construction pattern of a work device. The construction pattern of the work device includes a use condition of the work device that is patterned in advance. The construction pattern includes use conditions of the construction machine 4 and the transporter vehicle 5 that are to be set when a certain work is executed. The use conditions of the construction machine 4 and the transporter vehicle 5 include a combination condition of the construction machine 4 and the transporter vehicle 5. A plurality of construction patterns is stored in the construction pattern storage unit 43. A plurality of construction patterns for the earth filling work, and a plurality of construction patterns for the earth cutting work are at least stored in the construction pattern storage unit 43. A first earth filling pattern of executing the earth filling work using the construction machine 4 and the transporter vehicle 5 under a first use condition, a second earth filling pattern of executing the earth filling work using the construction machine 4 and the transporter vehicle 5 under a second use condition different from the first use condition, . . . , and an nth earth filling pattern of executing the earth filling work using the construction machine 4 and the transporter vehicle 5 under an nth use condition are stored in the construction pattern storage unit 43 for the earth filling work. In addition, a first earth cutting pattern of executing the earth cutting work using the construction machine 4 and the transporter vehicle 5 under the first use condition, a second earth cutting pattern of executing the earth cutting work using the construction machine 4 and the transporter vehicle 5 under the second use condition different from the first use condition, . . . , and an nth earth cutting pattern of executing the earth cutting work using the construction machine 4 and the transporter vehicle 5 under the nth use condition are stored in the construction pattern storage unit 43 for the earth cutting work.

By the input unit 50 being manipulated, a specific construction pattern corresponding to an input signal of the input unit 50 is selected from among the plurality of construction patterns stored in the construction pattern storage unit 43. The construction pattern acquisition unit 28 acquires, among the plurality of construction patterns stored in the construction pattern storage unit 43, the construction pattern selected according to the input signal of the input unit 50.

<Variation Factor Data Acquisition Unit>

The variation factor data acquisition unit 29 acquires variation factor data indicating a variation factor of the construction site 3. The variation factor data includes a variation factor such as a natural environment of the construction site 3, and affects work efficiency of construction. The variation factor data is stored in the variation factor data storage unit 44. In addition, the variation factor data is input by the input unit 50. The variation factor data acquisition unit 29 acquires the variation factor data from at least either one of the input unit 50 and the variation factor data storage unit 44.

The variation factor data includes soil property data indicating a type and a state of sediment in the construction site 3. In addition, the variation factor data includes buried object data indicating an underground buried object of the construction site 3. In addition, the variation factor data includes weather data of the construction site 3. The soil property data and the buried object data are acquired from a preliminary survey executed before construction. As a preliminary survey, a boring survey is exemplified. The weather data is acquired from a Meteorological Office or meteorological companies. The variation factor data acquired before construction is held in the variation factor data storage unit 44. In addition, the variation factor data acquired before construction is input from the input unit 50.

<Transport Condition Data Acquisition Unit>

The transport condition data acquisition unit 30 acquires transport condition data of the transporter vehicle 5. The transport condition data includes at least either one of a travel condition of the transporter vehicle 5 and a condition of a loaded object to be transported by the transporter vehicle 5. The travel condition of the transporter vehicle 5 includes at least one of an on-site average transport distance indicating an average value per unit time (e.g., per day) of travel distances for which the transporter vehicle 5 travels in the construction site 3 in a state in which sediment is loaded, a surplus soil conveyance average transport distance indicating an average value of travel distances for which the transporter vehicle 5 travels when conveying surplus soil generated in the construction site 3, to a surplus soil storage place provided on the outside of the construction site 3, and a bought soil conveyance average transport distance indicating an average value of travel distances for which the transporter vehicle 5 travels when conveying new sediment from a borrow pit provided on the outside of the construction site 3, to the construction site 3. The condition of the loaded object to be transported by the transporter vehicle 5 includes at least either one of a conveyed sediment type indicating a type (soil property) of sediment to be conveyed by the transporter vehicle 5 from the outside of the construction site 3, and an earth cutting sediment type indicating a type (soil property) of sediment to be excavated in the construction site 3 and conveyed by the transporter vehicle 5. The transport condition data is input from the input unit 50.

<Construction Plan Data Calculation Unit>

Based on the construction amount data calculated by the construction amount data calculation unit 24, and the original unit data acquired by the original unit data acquisition unit 26, the construction plan data calculation unit 20 calculates a construction plan of the construction site 3. Based on the construction amount data and the original unit data, the construction plan data calculation unit 20 calculates a construction plan corresponding to each target construction period, and a construction cost required when construction is executed using the construction plan. In the present embodiment, based on the construction amount data and the original unit data, the construction plan data calculation unit 20 calculates, for each of a plurality of target construction periods, a construction plan, and a construction cost required when construction is executed using the construction plan.

In the present embodiment, based on the construction amount data, the original unit data, and the construction patterns acquired by the construction pattern acquisition unit 28, the construction plan data calculation unit 20 calculates a plurality of construction plans respectively corresponding to a plurality of target construction periods, and calculates construction costs required when construction is executed using the plurality of respective calculated construction plans, in association with the plurality of construction plans.

In addition, based on the construction amount data, the original unit data, the construction patterns, and the transport condition data acquired by the transport condition data acquisition unit 30, the construction plan data calculation unit 20 calculates a plurality of construction plans respectively corresponding to a plurality of target construction periods, and calculates construction costs required when construction is executed using the plurality of respective calculated construction plans, in association with the plurality of construction plans.

The construction plan calculated by the construction plan data calculation unit 20 includes at least one of work device data indicating a type, a vehicle rank, and the number of work devices used in the construction site 3, process sheet data indicating a process sheet of construction that uses the work devices, and cost data indicating a cost required for construction. The process sheet includes at least either one of a work procedure of construction, and a work time of each work of construction.

In addition, if construction condition data is acquired by the construction condition data acquisition unit 27, the construction plan data calculation unit 20 calculates a construction plan based on construction amount data, original unit data, and construction condition data.

In addition, if variation factor data is acquired by the variation factor data acquisition unit 29, the construction plan data calculation unit 20 calculates a construction plan based on construction amount data, original unit data, and variation factor data.

In addition, if mode data is acquired by the mode data acquisition unit 25, the construction plan data calculation unit 20 calculates a construction plan based on construction amount data, original unit data, and mode data.

In addition, if construction result data is acquired by the construction result data acquisition unit 21, the construction plan data calculation unit 20 recalculates a construction plan based on construction result data.

In addition, the construction plan data calculation unit 20 calculates construction plan data for each work of construction. In addition, the construction plan data calculation unit 20 calculates construction plan data for each construction day.

A construction plan is calculated based on construction amount data calculated from a current landform and a design landform, and original unit data. As mentioned above, original unit data indicates a specific condition of a work device that includes at least one of a type and a vehicle rank of the work device, and the number of work devices. In other words, original unit data indicates work ability of a work device that can be input to a construction site. Based on an earth cutting portion and an earth cutting amount from a current landform, and original unit data indicating ability of a work device, the construction plan data calculation unit 20 can estimate which type or vehicle rank of a work device is input, and how many work devices are input, and how much time is required for completion of the earth cutting work in this case. Similarly, based on an earth filling portion and an earth filling amount to a current landform, and original unit data indicating ability of a work device, the construction plan data calculation unit 20 can estimate which type or vehicle rank of a work device is input, and how many work devices are input, and how much time is required for completion of the earth filling work in this case. Thus, based on construction amount data calculated from current landform data acquired by the current landform data acquisition unit 22 and design landform data acquired by the design landform data acquisition unit 23, and original unit data acquired by the original unit data acquisition unit 26, the construction plan data calculation unit 20 can calculate a time and a cost required for completing a specific work (earth cutting work or earth filling work) if a specific work device derived from the original unit data is used.

In addition, by calculating a construction plan using not only construction amount data and original unit data, but also a construction pattern, simulation accuracy of construction is enhanced. By the construction pattern being identified, the number of work devices used and work content of the work devices are determined. If a specific work is executed in a specific construction pattern using a work device derived from original unit data, a time and a cost required until the end of the work can be estimated. Thus, based on construction amount data, original unit data, and a construction pattern, the construction plan data calculation unit 20 can highly-accurately calculate a time and a cost required until the completion of a specific work if a specific work device derived from original unit data is used in a specific construction pattern.

In addition, by calculating a construction plan using not only construction amount data, original unit data, and a construction pattern, but also transport condition data, simulation accuracy of construction is further enhanced. A work time varies depending on a transport condition of the transporter vehicle 5. Thus, by a transport condition of the transporter vehicle 5 being identified by transport condition data acquired by the transport condition data acquisition unit 30, the construction plan data calculation unit 20 can highly-accurately calculate a time and a cost required until the completion of a specific work, based on construction amount data, original unit data, a construction pattern, and transport condition data.

In addition, the construction plan data calculation unit 20 calculates a work procedure of construction based on a current landform and a design landform. For example, if earth filling is performed on a portion requiring earth filling, if earth filling can be executed using cut earth in a construction range, without transporting sediment from the outside of the construction site 3, the construction plan data calculation unit 20 calculates a work procedure so that earth filling is executed using cut earth existing at a position having higher height (altitude) than the portion requiring earth filling. By calculating a work procedure so that sediment is transported from a high position to a low position, work burden is reduced, and work efficiency is enhanced.

<Construction Plan Data Output Unit>

The construction plan data output unit 31 outputs a construction plan calculated by the construction plan data calculation unit 20. The construction plan data output unit 31 outputs construction plan data to the result storage unit 45.

In addition, the construction plan data output unit 31 outputs, via the internet, the construction plan calculated by the construction plan data calculation unit 20, to at least one of the mobile terminal 7, the information terminal 8 provided in the construction site 3, the information terminal 13 provided in the construction company 12, and the information terminal 15 provided in the support center 14. The output device 704 of the mobile terminal 7, the output device 804 of the information terminal 8, the output device 134 of the information terminal 13, and the output device 154 of the information terminal 15 function as output devices that can output a construction plan.

The output device 704 of the mobile terminal 7, the output device 704 of the information terminal 8, the output device 134 of the information terminal 13, and the output device 154 of the information terminal 15 include display devices that can display image data. The output device 704, the output device 804, the output device 134, and the output device 154 include flat-panel displays such as a liquid crystal display, for example. The mobile terminal 7, the information terminal 8, the information terminal 13, and the information terminal 15 convert construction plan data indicating a construction plan, into image data, and display the image data on the output device 704, the output device 804, the output device 134, and the output device 154.

In addition, the output device 704, the output device 804, the output device 134, and the output device 154 may include printing devices that print construction plan data on a medium such as a paper medium. The output device 704, the output device 804, the output device 134, and the output device 154 may include print devices such as an ink-jet printer, for example.

The construction plan data output unit 31 outputs, to the output devices 704, 804, 134, and 154, output data to be output by the output devices 704, 804, 134, and 154, together with a command signal commanding an output format. The construction plan data output unit 31 designates an output format of output data to be output by the output devices 704, 804, 134, and 154, by outputting a command signal to the output devices 704, 804, 134, and 154. The output devices 704, 804, 134, and 154 output the output data based on the output format designated by the construction plan data output unit 31.

In the following description, the output device 704, the output device 804, the output device 134, and the output device 154 are assumed to be display devices, and the output device 704 of the mobile terminal 7 will be appropriately referred to as a display device 704, the output device 804 of the information terminal 8 will be appropriately referred to as a display device 804, the output device 134 of the information terminal 13 will be appropriately referred to as a display device 134, and the output device 154 of the information terminal 15 will be appropriately referred to as a display device 154. Output performed by the output devices includes display performed by the display devices.

The construction plan data output unit 31 outputs, to the display devices 704, 804, 134, and 154, display data to be displayed by the display devices 704, 804, 134, and 154, together with a command signal commanding a display format. The construction plan data output unit 31 designates a display format of display data to be displayed by the display devices 704, 804, 134, and 154, by outputting a command signal to the display devices 704, 804, 134, and 154. The display devices 704, 804, 134, and 154 display the display data based on the display format designated by the construction plan data output unit 31.

Current landform data acquired by the camera 11 of the drone 10, and design landform data created in the construction company 12 are output to the mobile terminal 7, the information terminal 8, the information terminal 13, and the information terminal 15 via the construction plan data calculation unit 20 and the construction plan data output unit 31. The construction plan data calculation unit 20 processes the acquired current landform data and design landform data into three-dimensional image data. In other words, the construction plan data calculation unit 20 converts image data of a current landform that has been acquired by the camera 11, into three-dimensional image data. In addition, the construction plan data calculation unit 20 converts two-dimensional design landform data or three-dimensional design landform data being a design drawing that has been created in the construction company 12, into three-dimensional image data. The construction plan data calculation unit 20 outputs, via the construction plan data output unit 31, three-dimensional image data of current landform data and design landform data to the mobile terminal 7, the information terminal 8, the information terminal 13, and the information terminal 15.

The construction plan data output unit 31 outputs current landform data and design landform data as display data, and outputs a three-dimensional display command signal as a command signal designating a display format. The construction plan data output unit 31 designates a display format of the display devices 704, 804, 134, and 154 so that current landform data and design landform data are three-dimensionally displayed. The display device 704 of the mobile terminal 7, the display device 804 of the information terminal 8, the display device 134 of the information terminal 13, and the display device 154 of the information terminal 15 three-dimensionally display current landform data and design landform data based on the display format designated by the construction plan data output unit 31.

In addition, the construction plan data output unit 31 can designate a display format of the display devices 704, 804, 134, and 154 so that current landform data and design landform data are displayed not only in a three-dimensional image format but also in a display format of at least one of a two-dimensional image format, a numerical format, a character format, and a table format.

In addition, construction result data acquired by the construction machine 4 is output, via the construction plan data calculation unit 20 and the construction plan data output unit 31, to the mobile terminal 7, the information terminal 8, the information terminal 13, and the information terminal 15. The mobile terminal 7, the information terminal 8, the information terminal 13, and the information terminal 15 function as second output devices that can output construction result data. The construction plan data calculation unit 20 processes the construction result data acquired by the construction machine 4, into three-dimensional image data. In other words, the construction plan data calculation unit 20 converts position data of each of a plurality of mesh points acquired by the construction machine 4, into three-dimensional image data. The construction plan data calculation unit 20 outputs, via the construction plan data output unit 31, the construction result data to the mobile terminal 7, the information terminal 8, the information terminal 13, and the information terminal 15.

The construction plan data output unit 31 outputs construction result data as display data, and outputs a three-dimensional display command signal as a command signal designating a display format. The construction plan data output unit 31 designates a display format of the display devices 704, 804, 134, and 154 so that construction result data is three-dimensionally displayed. The display device 704 of the mobile terminal 7, the display device 804 of the information terminal 8, the display device 134 of the information terminal 13, and the display device 154 of the information terminal 15 three-dimensionally display construction result data based on the display format designated by the construction plan data output unit 31.

In addition, the construction plan data output unit 31 can designate a display format of the display devices 704, 804, 134, and 154 so that construction result data is displayed not only in a three-dimensional image format but also in a display format of at least one of a two-dimensional image format, a numerical format, a character format, and a table format.

The construction plan data output unit 31 causes the output devices 704, 804, 134, and 154 to output a construction cost corresponding to a target construction period. In the present embodiment, the construction plan data output unit 31 causes the output devices 704, 804, 134, and 154 to output construction costs respectively corresponding to a plurality of target construction periods. The construction plan data output unit 31 causes the output devices 704, 804, 134, and 154 to output (display) target construction periods and construction costs that respectively correspond to a plurality of construction plans calculated by the construction plan data calculation unit 20.

The construction plan data output unit 31 causes the output devices 704, 804, 134, and 154 to output the plurality of target construction periods in association with the construction costs, and causes the output devices 704, 804, 134, and 154 to output a construction plan corresponding to a target construction period selected according to an input signal of the input unit 50, among the plurality of target construction periods output by the output devices 704, 804, 134, and 154.

The construction plan data output unit 31 causes the output devices 704, 804, 134, and 154 to output points indicating construction plans respectively corresponding to a plurality of target construction periods, in a graph in which a first axis indicating a target construction period and a second axis indicating a construction cost are defined, and causes the output devices 704, 804, 134, and 154 to output a construction plan corresponding to a selected point among the plurality of points.

<Remote Control Unit>

In addition, the computer system 2 includes the remote control unit 32 that outputs a control signal for remotely manipulating the construction machine 4, based on design landform data. The remote control unit 32 remotely controls the construction machine 4. If a design landform is changed according to a demand from the construction site 3, the remote control unit 32 outputs a control signal for remotely manipulating the construction machine 4, based on the changed design landform data.

[Support Center]

The information terminal 15 of the support center 14 can execute a function equivalent to the construction plan data calculation unit 20 of the computer system 2. For example, the information terminal 15 can execute generation of three-dimensional image data that can be executed by the construction plan data calculation unit 20. In place of the construction plan data calculation unit 20, the information terminal 15 can process construction result data acquired from the construction machine 4, into three-dimensional image data, and can convert two-dimensional design landform data or three-dimensional design landform data being a design drawing that has been created in the construction company 12, into three-dimensional image data. The generated three-dimensional image data is transmitted to the mobile terminal 7 and the information terminal 8 via the input-output interface circuit 155 and the computer system 2.

In addition, the support center 14 accepts a change of a design landform that has been demanded from the construction site 3. In the support center 14, design landform data indicating a changed design landform is calculated using the information terminal 15. The information terminal 15 transmits the changed design landform data to the computer system 2 via the internet, for example. The design landform data acquisition unit 23 of the computer system 2 acquires the changed design landform data output from the support center 14. The construction plan data calculation unit 20 recalculates construction plan data based on the changed design landform data.

The changed design landform data is transmitted to the construction machine 4. The work member 440 is controlled based on the changed design landform data.

[Construction Management Method]

Figure 10:
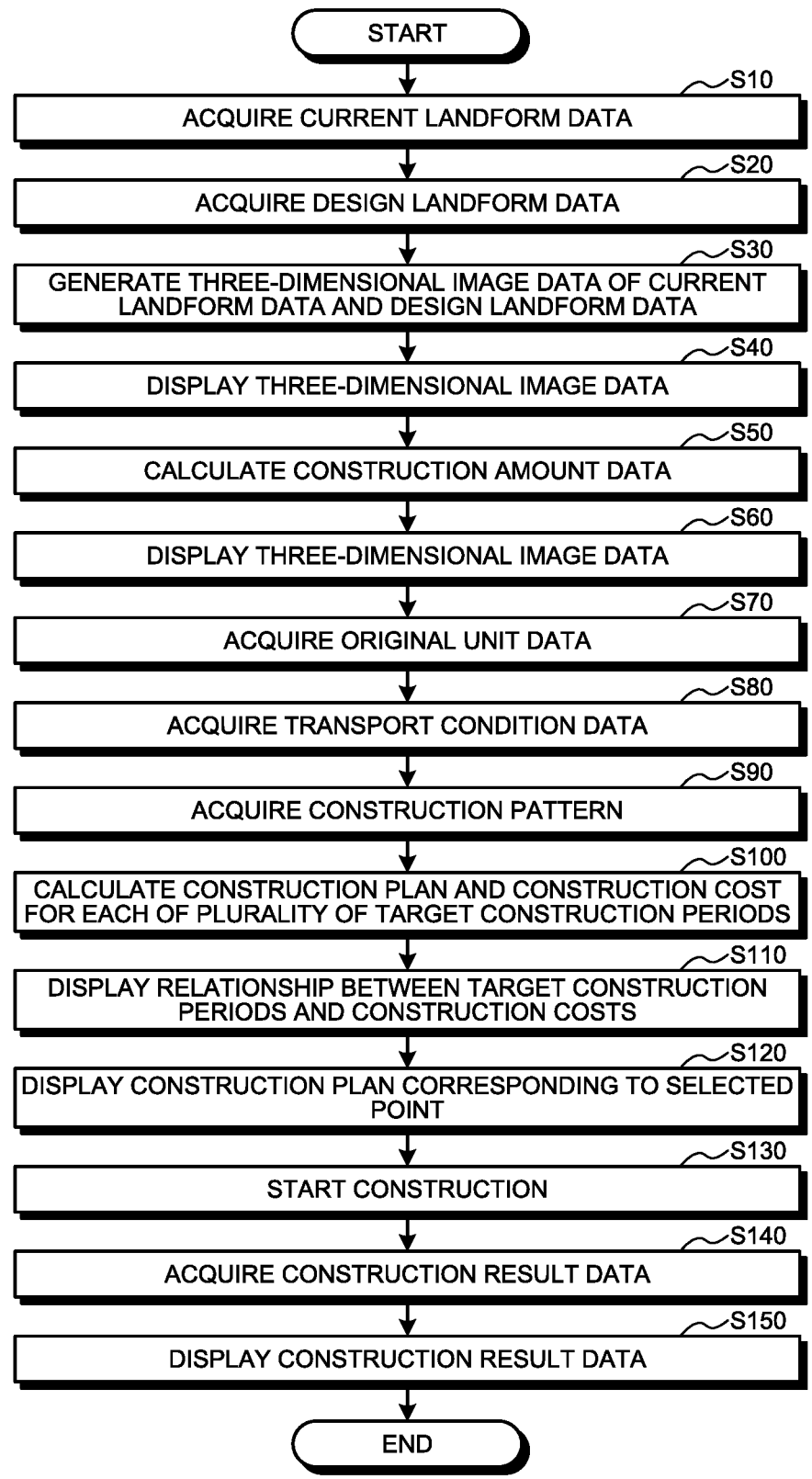
FIG. 10 is a flowchart illustrating a construction planning method according to the present embodiment.

Next, a construction management method that uses the construction management system 1 will be described. FIG. 10 is a flowchart illustrating a construction planning method.

As described above, the construction plan data output unit 31 of the computer system 2 causes the display device 704 of the mobile terminal 7, the display device 804 of the information terminal 8, the display device 134 of the information terminal 13, and the display device 154 of the information terminal 15 to output (display), to the mobile terminal 7, the information terminal 8, the information terminal 13, and the information terminal 15, target construction periods and construction costs that respectively correspond to a plurality of construction plans calculated by the construction plan data calculation unit 20. In the following description, for simplifying the description, the construction plan data output unit 31 is assumed to cause the display device 704 of the mobile terminal 7 to display target construction periods and construction costs that respectively correspond to a plurality of construction plans.

Measurement of the construction site 3 is performed using the drone 10. The camera 11 of the drone 10 acquires three-dimensional current landform data of the construction site 3. The current landform data acquisition unit 22 acquires current landform data from the camera 11 (Step S10).

In addition, design landform data is acquired by the design landform data acquisition unit 23 (Step S20).

The construction plan data calculation unit 20 generates three-dimensional image data of current landform data and three-dimensional image data of design landform data (Step S30).

The three-dimensional image data of current landform data and the three-dimensional image data of design landform data are transmitted to the mobile terminal 7. The three-dimensional image data of current landform data and the three-dimensional image data of design landform data are displayed on the display device 704 of the mobile terminal 7 (Step S40).

Figure 11:
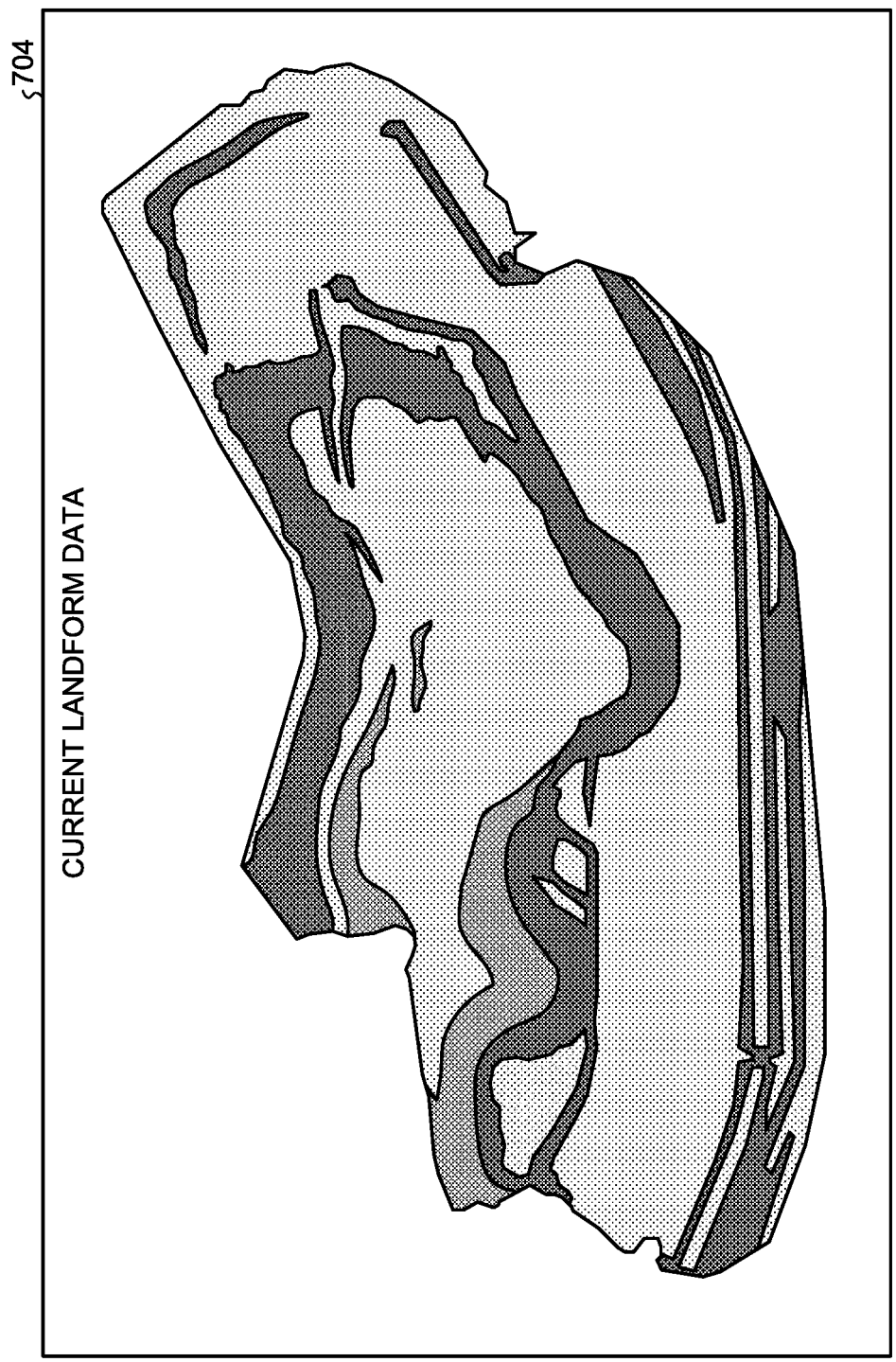
FIG. 11 is a diagram illustrating an output example of an output device according to the present embodiment.

FIG. 11 is a diagram illustrating a display example of the three-dimensional image data of current landform data that is caused by the display device 704. The construction plan data output unit 31 causes the display device 704 to three-dimensionally display current landform data. The display device 704 displays a plurality of portions of a current landform in different designs (colors or patterns). In the example illustrated in FIG. 11, the current landform is discretely divided into a plurality of portions based on the altitude of the current landform. A portion at an altitude in a first range is displayed in a first design, a portion at an altitude in a second range being different in altitude from the first range is displayed in a second design, and a portion at an altitude in an Nth range is displayed in an Nth design. Here, N is a natural number equal to or larger than 3.

Figure 12:
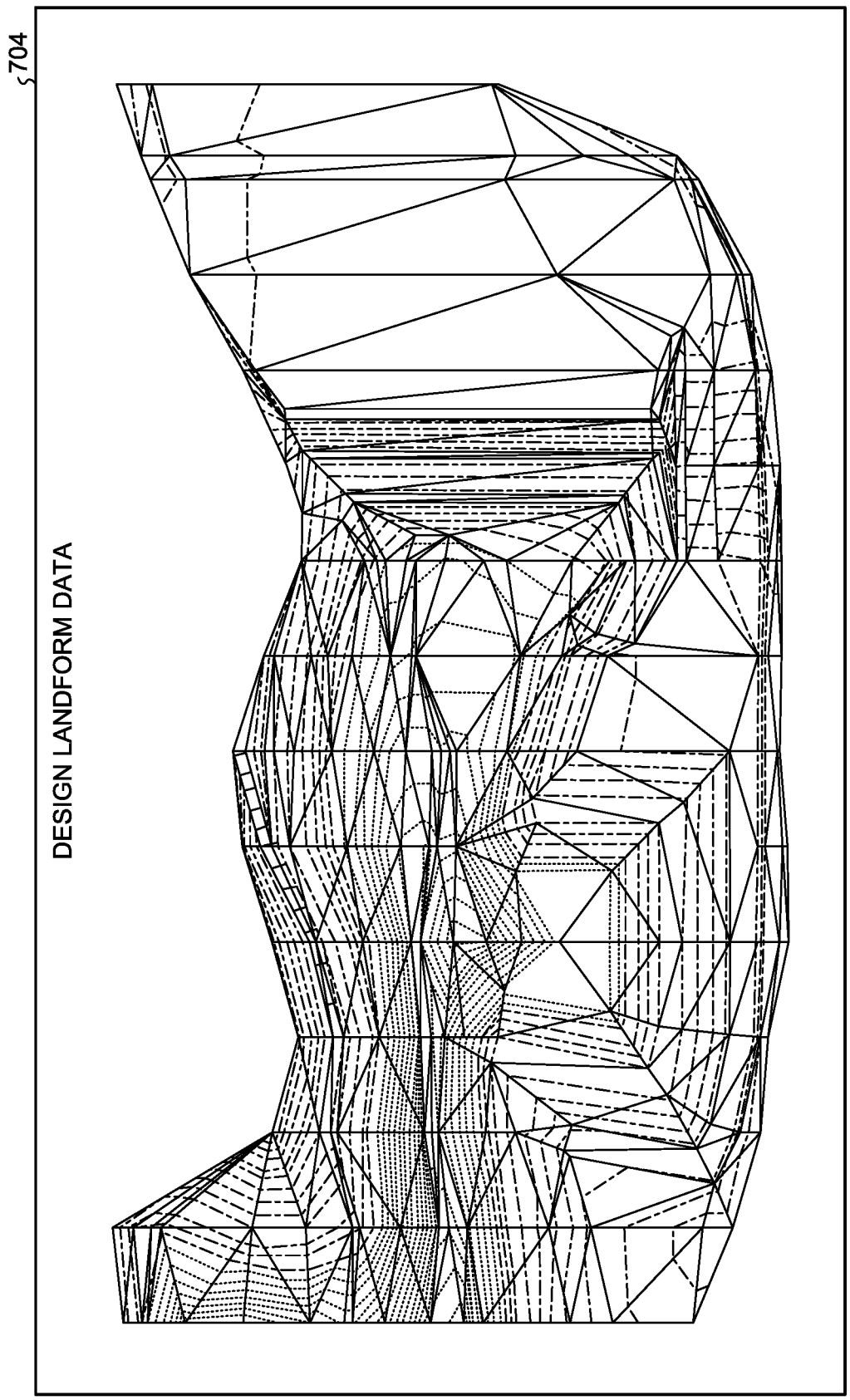
FIG. 12 is a diagram illustrating an output example of the output device according to the present embodiment.

FIG. 12 is a diagram illustrating a display example of the three-dimensional image data of design landform data that is caused by the display device 704. For example, a shape of a design landform is displayed as three-dimensional image data using polygon display. A construction plan data output unit 28 causes the display device 704 to three-dimensionally display the design landform data. The display device 704 displays a design landform being a target shape obtainable after construction, using a plurality of lines.

The construction amount data calculation unit 24 calculates construction amount data of the construction site 3 based on current landform data acquired by the current landform data acquisition unit 22, and design landform data acquired by the design landform data acquisition unit 23 (Step S50).

The construction plan data calculation unit 20 calculates three-dimensional image data of construction amount data, and transmits the three-dimensional image data to the mobile terminal 7 via the construction plan data output unit 31. The display device 704 of the mobile terminal 7 displays three-dimensional image data of construction range data and construction amount data (Step S60).

Figure 13:
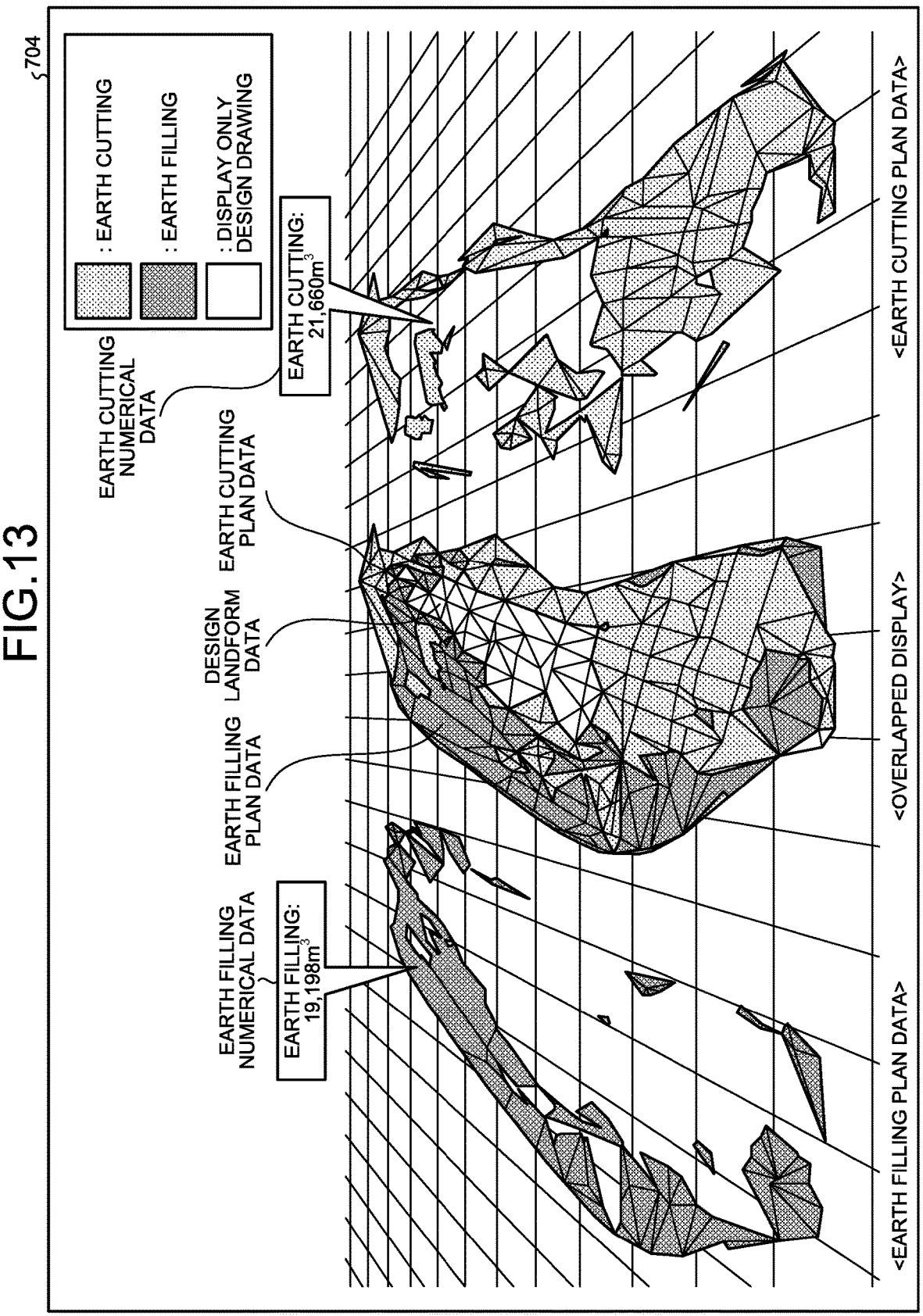
FIG. 13 is a diagram illustrating an output example of the output device according to the present embodiment.

FIG. 13 is a diagram illustrating a display example of design landform data and construction amount data that is caused by the display device 704. The construction amount data includes earth cutting portion data of earth cutting plan data, earth cutting numerical data of the earth cutting plan data, earth filling portion data of earth filling plan data, and earth filling numerical data of the earth filling plan data. As illustrated in FIG. 13, the construction plan data output unit 31 causes the display device 704 to three-dimensionally display, side by side, the earth cutting plan data (earth cutting portion data) and the earth filling plan data (earth filling portion data) in a construction range. The design landform data, the earth cutting plan data (earth cutting portion data), and the earth filling plan data (earth filling portion data) are three-dimensionally displayed using polygon display, for example. The earth cutting plan data (earth cutting portion data) and the earth filling plan data (earth filling portion data) are displayed in different designs (colors or patterns) so that the both data can be distinguished from each other when being displayed in an overlapped manner as described later.

In addition, the construction plan data output unit 31 causes the display device 704 to display, in an overlapped manner, the design landform data, the earth cutting plan data (earth cutting portion data), and the earth filling plan data (earth filling portion data) in the construction range. The design landform data, the earth cutting plan data (earth cutting portion data), and the earth filling plan data (earth filling portion data) are displayed in an overlapped manner in different designs.

In addition, the construction plan data output unit 31 causes the display device 704 to display earth cutting numerical data and earth filling numerical data. In the example illustrated in FIG. 13, an earth cutting amount "21,660 $m^3$" is displayed as the earth cutting numerical data, and an earth filling amount "19,198 $m^3$" is displayed as the earth filling numerical data.

In addition, the construction plan data output unit 28 may cause the display device 704 to three-dimensionally display, side by side, the current landform data and the earth cutting plan data (earth cutting portion data or the earth cutting amount data), or to display, side by side, the current landform data and the earth filling plan data (earth filling portion data or the earth filling amount data). The construction plan data output unit 28 can cause the display device 704 to three-dimensionally display, side by side, at least two of current landform data, design landform data, construction range data, earth cutting plan data (earth cutting portion data or earth cutting amount data), and earth filling plan data (earth filling portion data or earth filling amount data).

In addition, the construction plan data output unit 28 may cause the display device 704 to display, in an overlapped manner, current landform data and earth cutting plan data (earth cutting portion data or earth cutting amount data), and to display, in an overlapped manner, current landform data and earth filling landform data (earth filling portion data or earth filling amount data) The construction plan data output unit 28 can cause the display device 704 to display, in an overlapped manner, at least two of current landform data, design landform data, construction range data, earth cutting plan data (earth cutting portion data or earth cutting amount data), and earth filling plan data (earth filling portion data or earth filling amount data).

In addition, the construction plan data output unit 28 may cause the display device 704 to display earth cutting numerical data, and not to display earth filling numerical data. In addition, the construction plan data output unit 28 may cause the display device 704 to display earth filling numerical data, and not to display earth cutting numerical data. As described above, by displaying earth cutting plan data, earth filling plan data, design landform data, current landform data, and the like on the display device 704 through three-dimensional display, a manager or the like of the construction site can recognize a location, a type, and a degree of necessary construction. In addition, for example, by displaying, in an overlapped manner, current landform data and earth cutting plan data or earth filling plan data, progress of construction can be recognized.

The original unit data acquisition unit 26 acquires original unit data indicating a specific condition of a work device (Step S70).

The original unit data acquisition unit 26 acquires original unit data (default value) of a work device with a standard specification, among a plurality of original unit data stored in the original unit data storage unit 41. The work device with the standard specification includes an excavator with a standard specification that includes a standard bucket, a bulldozer with a standard specification that includes a standard blade, and a standard transporter vehicle that includes a standard vessel.

The transport condition data acquisition unit 30 acquires transport condition data (Step S80). The transport condition data is input from the input unit 50. The input unit 50 is manipulated, and an input signal of the input unit 50 that corresponds to the manipulation is acquired by the transport condition data acquisition unit 30. In the present embodiment, the input unit 50 includes the input device 703 of the mobile terminal 7, and an input signal generated by the input device 703 being manipulated is transmitted to the transport condition data acquisition unit 30 via the internet.

In the input performed by the input device 703, an input screen prompting an input of transport condition data is displayed on the display device 704. FIG. 14 illustrates a display example of the display device 704 that displays input fields for prompting an input of transport condition data. The worker Ma that can manipulate the mobile terminal 7 manipulates the input device 703 of the mobile terminal 7, and inputs transport condition data of the transporter vehicle 5 into the input fields displayed on the display device 704. As illustrated in FIG. 14, as transport condition data, input fields as to an on-site average transport distance, a surplus soil conveyance average transport distance, a bought soil conveyance average transport distance, a ground converted conveyed soil amount, a conveyed sediment type, an earth cutting sediment type, presence or absence of cut earth disposal, presence or absence of a provisional storage place, an average transport distance from the provisional storage place, and presence or absence of provisional storage place stopover are provided. A person who can manipulate the mobile terminal 7 may be the worker Mb of the construction company 12.

The on-site average transport distance indicates an average value, per unit time (for example, per day), of travel distances for which the transporter vehicle 5 travels in the construction site 3 in a state in which sediment is loaded. As an example, FIG. 14 illustrates an example in which "120" is input into the input field of the on-site average transport distance [m].

The surplus soil conveyance average transport distance indicates an average value of travel distances for which the transporter vehicle 5 travels when conveying surplus soil generated in the construction site 3, to a surplus soil storage place provided on the outside of the construction site 3. As an example, FIG. 14 illustrates an example in which "2.3" is input into the input field of the surplus soil conveyance average transport distance [km].

The bought soil conveyance average transport distance indicates an average value of travel distances for which the transporter vehicle 5 travels when conveying new sediment from a borrow pit provided on the outside of the construction site 3, to the construction site 3. As an example, FIG. 14 illustrates an example in which "4.0" is input into the input field of the bought soil conveyance average transport distance [km].

The ground converted conveyed soil amount indicates a value obtained by converting sediment conveyed from the borrow pit to the construction site 3, into a size (volume) of a ground of the construction site 3. As an example, FIG. 14 illustrates an example in which "7000" is input into the input field of ground converted conveyed soil amount [$m^3$].

The conveyed sediment type indicates a type or a state of sediment conveyed by the transporter vehicle 5 from the outside of the construction site 3. The earth cutting sediment type indicates a type or a state of sediment excavated in the construction site 3, and conveyed by the transporter vehicle 5. In the present embodiment, the conveyed sediment type and the earth cutting sediment type are selected from "normal", "argilliferous", and "sandy". As an example, FIG. 14 illustrates an example in which "normal" is input into the input field of the conveyed sediment type, and "normal" is input into the earth cutting sediment type.

The presence or absence of cut earth disposal includes selecting whether to dispose of sediment cut in the construction site 3. As an example, FIG. 14 illustrates an example in which "absent" is selected for the cut earth disposal.

The presence or absence of a provisional storage place includes selecting whether a place for provisionally storing sediment cut in the construction site 3 exists. As an example, FIG. 14 illustrates an example in which "present" is selected for the provisional storage place.

If a provisional storage place exists, the average transport distance from the provisional storage place indicates an average value of travel distances for which the transporter vehicle 5 travels when conveying sediment from the provisional storage place to the construction site 3. As an example, FIG. 14 illustrates an example in which "1.0" is input into the input field of the average transport distance [km] from the provisional storage place.

The presence or absence of provisional storage place stopover includes selecting whether the transporter vehicle 5 that conveys sediment into the construction site 3 passes though the provisional storage place. As an example, FIG. 14 illustrates an example in which "present" is selected for the provisional storage place stopover.

In addition, FIG. 14 illustrates an example in which earth cutting numerical data and earth filling numerical data are displayed on the display device 704 as construction amount data, together with the input fields. An earth cutting soil amount "21660.0 $m^3$" is displayed as the earth cutting numerical data, and an earth filling soil amount "19198.0 $m^3$" is displayed as the earth filling numerical data. In addition, a location of the construction site 3, and a scheduled construction period that is based on construction condition data are displayed on the display device 704.

In addition, an earth filling compacted area, an earth cutting area, an earth filling area, an earth cutting construction section slope area, and an earth filling construction section slope area are also displayed on the display device 704.

The construction pattern acquisition unit 28 acquires a construction pattern of a work device (Step S90). The construction pattern is input from the input unit 50 (input device 703). The input device 703 is manipulated, and an input signal generated according to the manipulation is acquired by the construction pattern acquisition unit 28 via the internet.

In the input performed by the input device 703, an input screen prompting an input of a construction pattern is displayed on the display device 704. An icon for prompting an input (selection) of a construction pattern is displayed on the display device 704. The worker Ma that can manipulate the mobile terminal 7 manipulates the input device 703 of the mobile terminal 7, and selects a specific icon from among a plurality of icons displayed on the display device 704. The plurality of icons is associated with a plurality of construction patterns stored in the construction pattern storage unit 43. By the icon being selected by the input device 703, the construction pattern acquisition unit 28 acquires, among the plurality of construction patterns stored in the construction pattern storage unit 43, the construction pattern selected according to the input signal of the input device 703 (the input unit 50).

Figure 15:
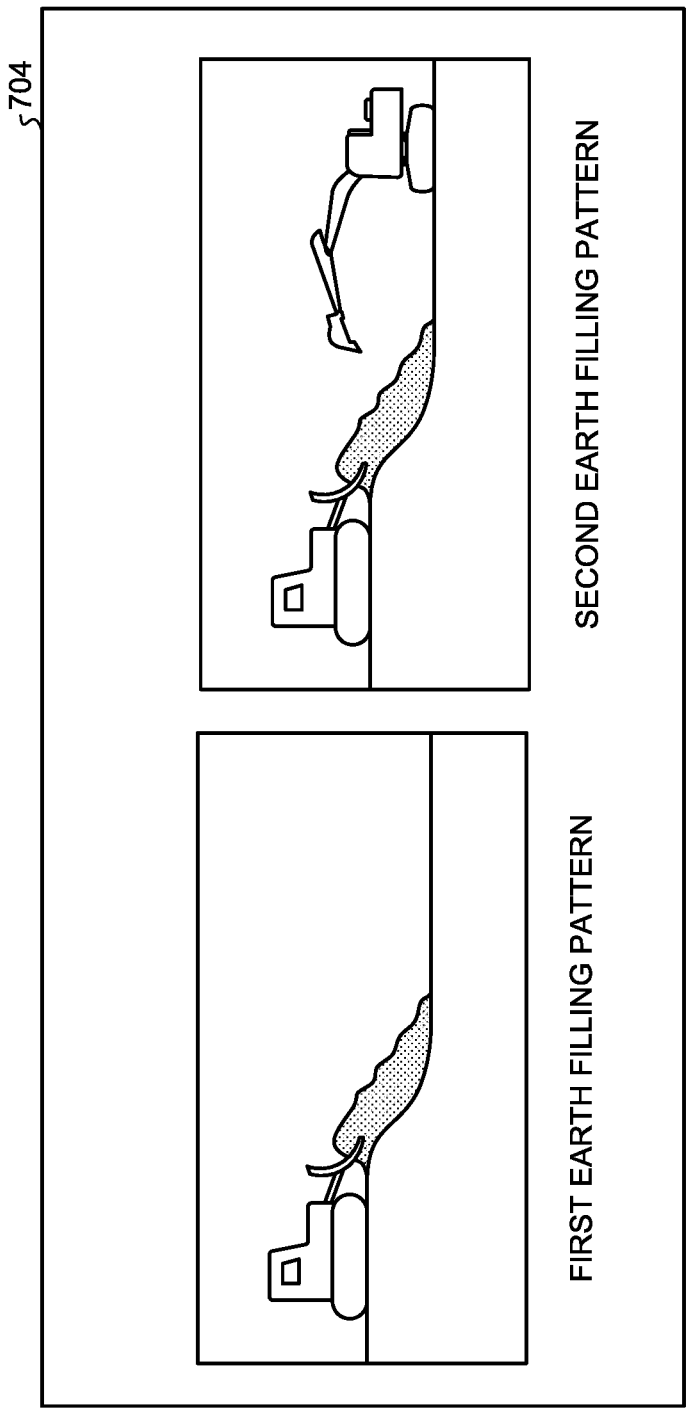
FIG. 15 is a diagram illustrating an output example of the output device according to the present embodiment.

FIG. 15 illustrates a display example of the display device 704 that displays icons for prompting an input (selection) of a construction pattern. FIG. 15 is a diagram illustrating an example of icons corresponding to a first earth filling pattern and a second earth filling pattern of executing an earth filling work using a work device, among a plurality of construction patterns stored in the construction pattern storage unit 43.

The first earth filling pattern is an earth filling pattern in which an earth filling work is executed using sediment dozed by the bulldozer 4A.

The second earth filling pattern is an earth filling pattern in which an earth filling work is executed using sediment dozed by the bulldozer 4A, and the filled sediment is shaped by the excavator 4B.

In addition, each of the earth filling patterns illustrated in FIG. 15 is an example. The earth filling work may be executed only by the excavator 4B, the earth filling work may be executed by at least two bulldozers 4A, and the earth filling work may be executed by at least two excavators 4B. N types (N is a natural number equal to or larger than 3) of earth filling patterns are stored in the construction pattern storage unit 43. N types of icons corresponding to N types of earth filling patterns are displayed on the display device 704. The worker Ma selects a specific icon from among the N types of icons, and manipulates the input device 703. An earth filling pattern selected according to an input signal of the input device 703 is thereby acquired by the construction pattern acquisition unit 28.

Figure 16:
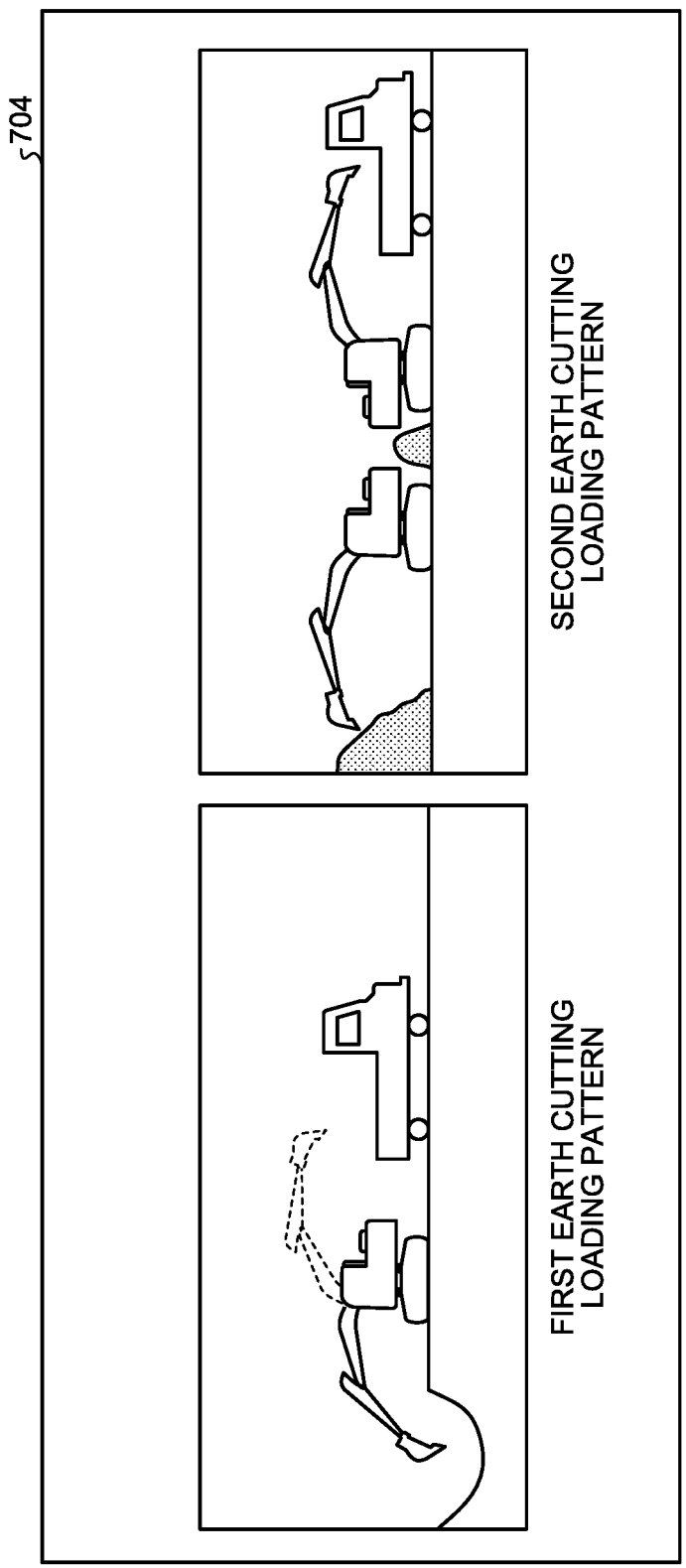
FIG. 16 is a diagram illustrating an output example of the output device according to the present embodiment.
Figure 17:
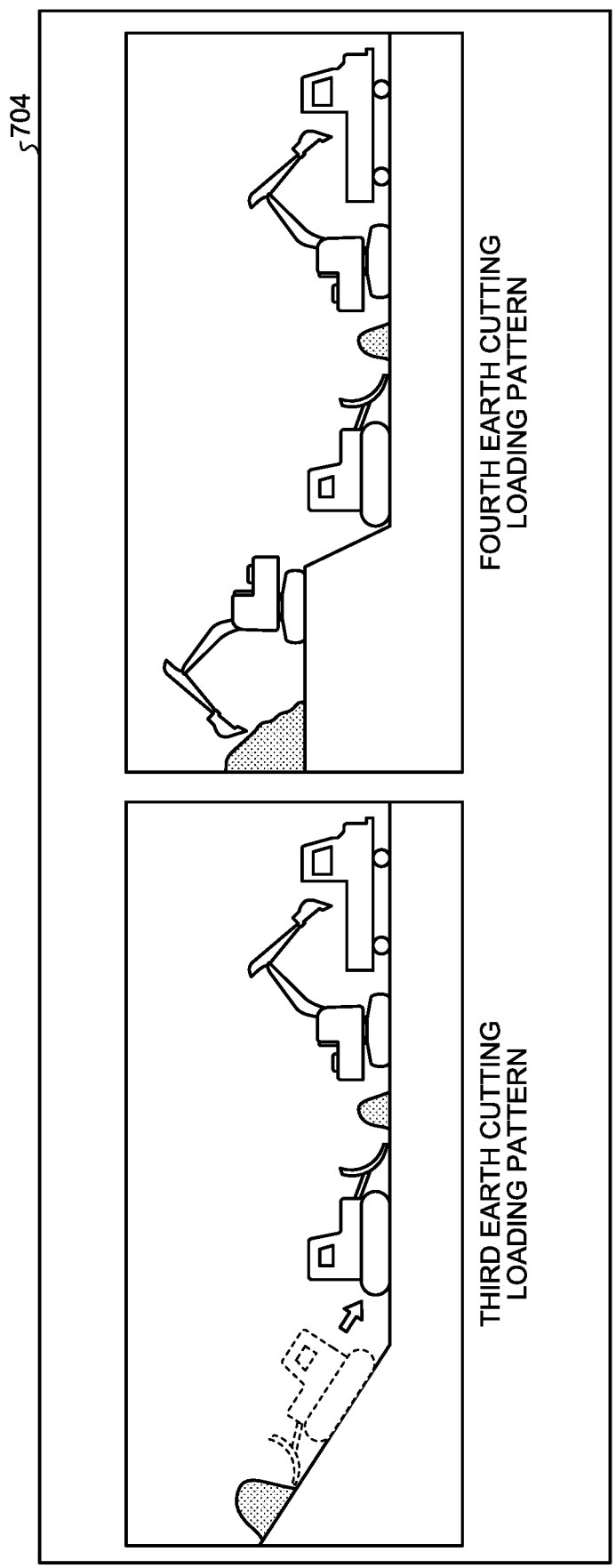
FIG. 17 is a diagram illustrating an output example of the output device according to the present embodiment.

FIGS. 16 and 17 each illustrate a display example of the display device 704 that displays icons for prompting an input (selection) of a construction pattern. FIGS. 16 and 17 are diagrams illustrating examples of icons corresponding to a first earth cutting loading pattern, a second earth cutting loading pattern, a third earth cutting loading pattern, and a fourth earth cutting loading pattern of executing an earth cutting work and a loading work using a work device, among a plurality of construction patterns stored in the construction pattern storage unit 43.

The first earth cutting loading pattern is an earth cutting loading pattern in which a ground is cut by the excavator 4B, and the cut sediment is loaded onto the transporter vehicle 5 by the vehicle main body 400B swinging, without the travel apparatus 450B of the excavator 4B substantially moving.

The second earth cutting loading pattern is an earth cutting loading pattern in which a ground is cut by a first excavator 4B, a second excavator 4B and the transporter vehicle 5 come close to each other, and the sediment cut by the first excavator 4B is loaded onto the transporter vehicle 5 by the second excavator 4B.

The third earth cutting loading pattern is an earth cutting loading pattern in which a ground is cut by the bulldozer 4A, and sediment dozed by the bulldozer 4A is loaded onto the transporter vehicle 5 by the excavator 4B.

The fourth earth cutting loading pattern is an earth cutting loading pattern in which a ground is cut by the first excavator 4B, sediment cut by the first excavator 4B is dozed by the bulldozer 4A, and the sediment dozed by the bulldozer 4A is loaded onto the transporter vehicle 5 by the second excavator 4B.

In addition, each of the earth cutting loading patterns illustrated in FIGS. 16 and 17 is an example. N types (N is a natural number equal to or larger than 3) of earth cutting loading patterns are stored in the construction pattern storage unit 43. N types of icons corresponding to N types of earth cutting loading patterns are displayed on the display device 704. The worker Ma selects a specific icon from among the N types of icons, and manipulates the input device 703. An earth cutting loading pattern selected according to an input signal of the input device 703 is thereby acquired by the construction pattern acquisition unit 28.

In addition, construction patterns may include patterns of transport performed by the transporter vehicle 5, which are not illustrated in the drawings. The worker Ma can select a specific transport pattern from among a plurality of transport patterns, by manipulating the input device 703.

Based on the construction amount data calculated in Step S50, the original unit data acquired in Step S70, the transport condition data acquired in Step S80, and the construction pattern acquired in Step S90, the construction plan data calculation unit 20 calculates, for each of a plurality of target construction periods, a construction plan and a construction cost required when construction is executed using the construction plan (Step S100).

Based on the construction amount data, the original unit data, the transport condition data, and the construction pattern, the construction plan data calculation unit 20 simulates construction for each of the plurality of target construction periods, and formulates an optimum construction plan for each of the plurality of target construction periods.

As mentioned above, the original unit data includes ability of a work device, and as an example, includes a size of the work member 440. Thus, for example, an amount of soil that can be excavated by the bucket 440B through one excavation operation is obtained based on the original unit data. The number of excavation operations of the bucket 440B necessary for shaping a current landform into a design landform is obtained based on a difference between current landform data and design landform data. In addition, the number of excavation operations of the excavator 4B that can be executed per unit time (work ability of the excavator 4B) is also obtained from original unit data being known data. Thus, which excavator 4B is to be used, and how many excavators 4B are required for completing construction within a target construction period can be calculated.

In addition, in the case of transporting sediment from the outside of the construction site 3 into the construction site 3 using the transporter vehicle 5 for performing earth filling, if the transporter vehicle 5 travels on a general road, a timing at which a transporter vehicle 3 transports sediment into the construction site 3, or an amount of sediment that can be transported per unit time may vary depending on a travel route, a travel speed, a traffic condition (presence or absence of traffic jam, etc.), and the like. For example, if the transporter vehicle 5 arrives at the construction site 3 after a target timing, there is a possibility of occurrence of a situation in which a work of the construction machine 4 or the worker Ma needs to be interrupted until the transporter vehicle 5 arrives at the construction site 3. Thus, based on transport condition data related to the transporter vehicle 5 (surplus soil conveyance average transport distance or bought soil conveyance average transport distance) that includes a travel route of the transporter vehicle 5, an expected time point of arrival at the construction site 3, and the like, a construction plan can be formulated so that an efficient work is executed.

In addition, even if a work device having identical work ability is used, a work speed varies depending on soil properties. For example, when the case of cutting, filling, or dozing argilliferous sediment, and the case of cutting, filling, or dozing sandy sediment are compared, even if a work device having identical work ability is used, a work speed declines and a work time elongates in the case of processing argilliferous sediment, as compared with those in the case of processing sandy sediment. A work speed of a work device that corresponds to a soil property can be obtained in advance. Thus, by considering transport condition data including a conveyed sediment type and an earth cutting sediment type, a work time required when a certain work device is used can be simulated.

Based on the construction pattern, the number of work devices used, and work content of the work devices are determined. Thus, if a specific work is executed in a specific construction pattern using a work device derived from original unit data, a time and a cost required until the end of the work can be estimated. Thus, based on construction amount data, original unit data, and a construction pattern, the construction plan data calculation unit 20 can highly-accurately calculate a time and a cost required until the completion of a specific work (earth cutting work or earth filling work) if a specific work device derived from original unit data is used in a specific construction pattern. In addition, based on the construction pattern, the construction plan data calculation unit 20 can obtain which work device is to be used and how many work devices are to be used, or which type of worker is to be input into a work site, and how many workers are to be input into the work site.

In addition, construction simulation may be executed considering variation factor data. A soil property may vary during the progress of excavation of the construction site 3. Even if a work device having identical work ability is used, a work speed varies depending on soil properties. For example, when the case of excavating an argilliferous land surface, and the case excavating a sandy land surface are compared, even if a work device having identical work ability is used, a work speed declines and a work time elongates in the case of excavating the argilliferous land surface, as compared with those in the case of excavating the sandy land surface. Soil properties are known data that can be obtained in advance through a preliminary survey such as a boring survey. In addition, a work speed of a work device that corresponds to a soil property can also be obtained in advance. Thus, by considering variation factor data including soil property data, a work time required when a certain work device is used can be simulated.

In addition, a difficulty of construction (trafficability) varies between rainy weather and fine weather. The ability of a land surface that can stand the traveling of a work device (travelable degree) is referred to as trafficability. For example, in rainy weather, a travelable maximum speed of the transporter vehicle 5 may become slower, and a work speed of the construction machine (e.g., the bulldozer 4A) may become slower, as compared with those in fine weather. A work speed of a work device and a travelable maximum speed of the transporter vehicle 5 that correspond to weather can also be obtained in advance. Thus, by considering variation factor data including weather data, a work time required when a certain work device is used can be simulated. In addition, based on the weather data, a construction plan of inputting the construction machine 4 having a rainproof or snowproof specification into the construction site 3 can be formulated. Examples of the construction machine 4 having a rainproof specification include the bulldozer 4A including a wide crawler track so as to be able to travel on a muddy road surface, the transporter vehicle 5 including snowproof tires, or the like.

In addition, in some cases, a work available period in which construction can be executed, and a work unavailable period in which construction cannot be executed are determined by audit or work rules of the construction site 3. Schedule data indicating the work available time and the action unavailable time is known data identified in advance, and is stored in a construction condition database as construction condition data. If the construction condition data is acquired, the construction plan data calculation unit 20 may execute simulation of construction and calculate a construction plan, based on the construction condition data including the schedule data as mentioned above.

In addition, process design data indicating work content and a work procedure to be executed in construction is determined in advance, and stored in the construction condition database as construction condition data. The construction plan data calculation unit 20 may calculate construction plan data based on the construction condition data including the process design data.

The construction plan data output unit 31 causes the display device 704 to display relationship between the target construction periods and the construction costs that respectively correspond to the plurality of construction plans calculated in Step S100 (Step S110).

Figure 18:
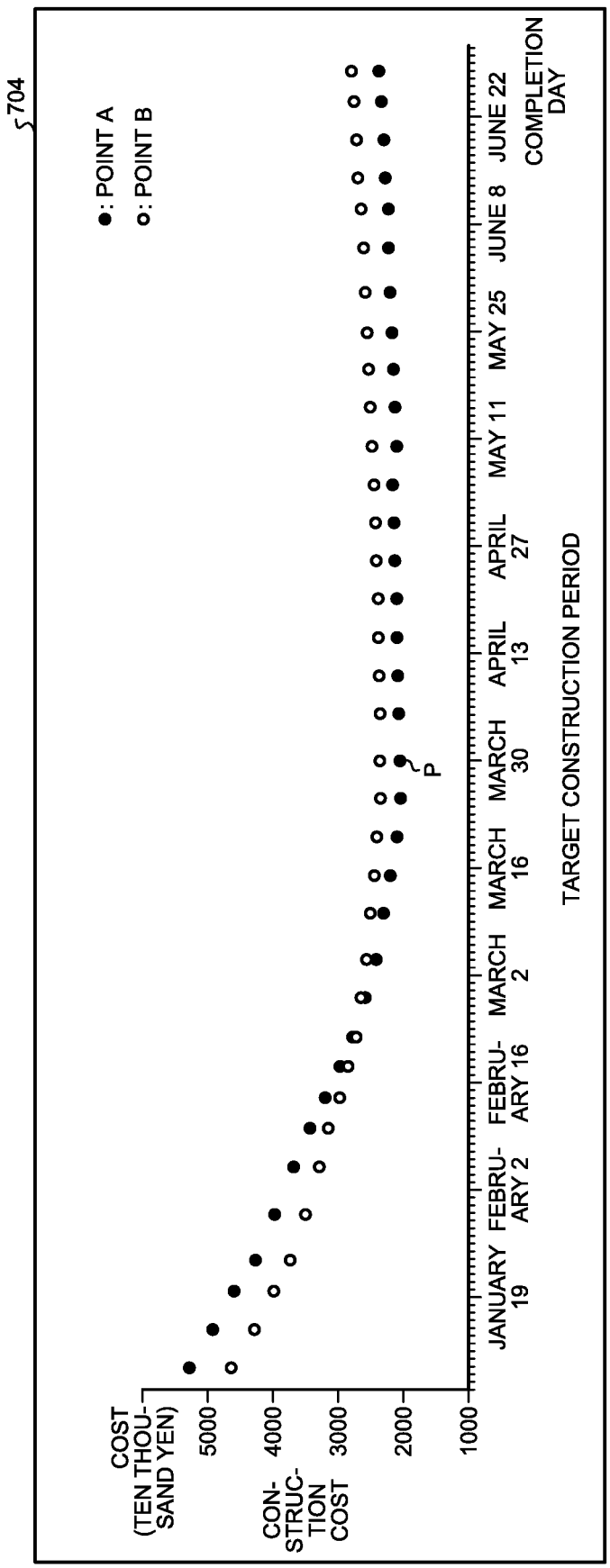
FIG. 18 is a diagram illustrating an output example of the output device according to the present embodiment.

FIG. 18 is a diagram illustrating a display example of the display device 704 that displays relationship between a construction plan calculated for each of the plurality of target construction periods, and a construction cost required when construction is executed using the construction plan. As illustrated in FIG. 18, the construction plan data output unit 31 causes the display device 704 to display the plurality of target construction periods, and construction costs respectively corresponding to the plurality of target construction periods. The construction plan data output unit 31 causes the display device 704 to display relationship between the target construction periods and the construction costs that respectively correspond to the plurality of calculated construction plans.

As illustrated in FIG. 18, the construction plan data output unit 31 causes the display device 704 to output a graph in which a horizontal axis indicating a target construction period, and a vertical axis indicating a construction cost are defined. The construction plan data output unit 31 causes the display device 704 to display, in the graph, points indicating the construction plans respectively corresponding to the plurality of target construction periods.

In the example illustrated in FIG. 18, the horizontal axis indicates dates being target construction periods. In addition, the horizontal axis may indicate the numbers of days left to the target construction periods. The vertical axis indicates a construction cost (cost) required when construction is executed up to a target construction period according to a construction plan calculated by the construction plan data calculation unit 20.

In addition, in the present embodiment, construction simulation is executed for each of a case in which an ICT construction machine is used as the construction machine 4, and a case in which a normal construction machine not having an ICT function is used. In FIG. 18, points A indicated by black circles indicate construction simulation results obtainable when an ICT construction machine is used. Points B indicated by white circles indicate construction simulation results obtainable when a normal construction machine not having an ICT function is used. As illustrated in FIG. 18, it can be seen that, if a target construction period becomes longer, construction efficiency becomes higher and a construction cost is suppressed in the case of using the ICT construction machine, as compared with the case of using the normal construction machine. In addition, a graph indicating relationship between target construction periods and construction costs that respectively correspond to a plurality of construction plans may be indicated as a bar graph.

As illustrated in FIG. 18, display is performed by the display device 703 using points in which a plurality of target construction periods is associated with construction costs. Each point illustrated in FIG. 18 includes calculated construction plan data. If the worker Ma selects a specific point from among a plurality of points displayed on the display device 704, by manipulating the input device 703, a construction plan corresponding to the selected point is displayed on the display device 704 in a display form using, for example, popup display or balloon display.

For example, if it is desired that "March 30 is desired to be set as a target construction period using the ICT construction machine", the worker Ma manipulates an operating device 703 while viewing a display screen of the display device 704 illustrated in FIG. 18, and selects, from among the plurality of points displayed on the display device 704, a point P having March 30 as a target construction period in a case where the ICT construction machine is used. If the input device 703 includes a mouse, the worker Ma puts a cursor of the mouse on the point P and clicks the point. If the input device 703 includes a touch panel, the worker Ma taps the point P displayed on the display screen. Among the plurality of target construction periods displayed on the display device 704, a specific target construction period (March 30) and a construction cost that correspond to the point P are thereby displayed according to an input signal of the input device 703. Here, if a certain point is selected, in addition to a target construction period and a construction cost, information related to a type and a vehicle rank of a necessary construction machine 4, and information related to a vehicle rank and the number of transporter vehicles 5 may be displayed.

The construction plan data output unit 31 causes a display device 703 to display a construction plan corresponding to a target construction period selected according to an input signal of the input device 703, among the plurality of target construction periods displayed on the display device 704. In other words, the construction plan data output unit 31 causes the display device 704 to display a construction plan corresponding to a point (for example, point P) selected according to an input signal of the input device 703, among the plurality of points indicating the construction plans respectively corresponding to the plurality of target construction periods that are displayed on the display device 704 (Step S120).

FIG. 19 illustrates a display example of the display device 704 that is obtained after clicking or tapping any point from the graph indicating the relationship between target construction periods and construction costs that respectively correspond to a plurality of construction plans. As illustrated in FIG. 19, as detailed data of the point, data of a construction plan including a process sheet of construction and the like is displayed on the display device 704. As illustrated in FIG. 19, as construction plan data, process sheet data indicating a process sheet of construction that uses a work device is displayed. In addition, as construction plan data, work device data indicating a type and the number of work devices used in the construction site 3, and cost data indicating a cost required when construction is executed using the construction plan are displayed.

As process sheet data, flow data indicating work content, a work procedure, and a work period of construction is displayed.

As flow data, items of a plurality of work contents are displayed. As an example, FIG. 19 illustrates an example in which "earth cutting" indicating an earth cutting work, "half cutting" indicating a half cutting excavation work, "earth filling" indicating an earth filling work, "spreading" indicating a spreading work, and "slope" indicating a slope excavation work are displayed.

In the example illustrated in FIG. 19, a work procedure is planned in the order of the earth cutting work, the half cutting excavation work, the earth filling work, the spreading work, and the slope excavation work.

Work period data of each work is displayed as a bar C and a bar D. The construction plan data output unit 31 causes the display device 704 to simultaneously display a construction plan calculated in the construction plan data calculation unit 20 at a first time point (for example, a current time point), and a construction plan calculated at a second time point (past time point) earlier than the first time point. In the example illustrated in FIG. 19, the bar C is a bar indicating a construction plan (process sheet) calculated at the first time point, and the bar D is a bar indicating a construction plan (process sheet) calculated at the second time point.

As an example, the earth cutting work calculated at the first time point is executed from May 1, 2015, and May 8 is set as a work construction period. The half cutting excavation work calculated at the first time point is executed from May 11, 2015, and May 15 is set as a work construction period. The earth filling work calculated at the first time point is executed from May 18, 2015, and May 20 is set as a work construction period. The spreading work calculated at the first time point is executed from May 21, 2015, and May 22 is set as a work construction period. The slope excavation work calculated at the first time point is executed from May 25, 2015, and May 29 is set as a work construction period.

On the other hand, the earth cutting work calculated at the second time point is executed from Apr. 29, 2015, and May 7 is set as a work construction period. The half cutting excavation work calculated at the second time point is executed from May 8, 2015, and May 14 is set as a work construction period. The earth filling work calculated at the second time point is executed from May 15, 2015, and May 21 is set as a work construction period. The spreading work calculated at the second time point is executed from May 22, 2015, and May 26 is set as a work construction period. The slope excavation work calculated at the second time point is executed from May 27, 2015, and June 1 is set as a work construction period. In this manner, comparison can be performed between a simulation result of a construction plan obtained in the past, and a simulation result of a construction plan currently obtained.

As work device data, resource data such as a "truck (dump truck)", a "power shovel (excavator)", a "bull (bulldozer)", a "supervisor (site supervisor)", and an "operator (worker)" is displayed. In addition, a cost per day of each of these resources, the number of devices (heads) used, operating days in construction, and a cost required when each resource is operated for all operating days are displayed. In addition, a numerical value such as a cost of a resource per day is an example.

Also for these cost data and the like, data calculated at the first time point (this time) and data calculated at the second time point (previous time) are simultaneously displayed on the display device 704.

In the construction site 3, construction is started based on the determined construction plan (Step S130). Design landform data and construction plan data are transmitted from the construction plan data output unit 31 to the construction machine 4. Based on the design landform data, the construction machine 4 performs construction of the construction site 3 while controlling the work member 440. This enables even the construction machine 4 manipulated by an inexperienced driver to perform highly-accurate construction in accordance with a design drawing. In addition, drastic enhancement in productivity is caused in the construction machine 4 manipulated by an experienced driver.

Construction result data is transmitted in real time, for example, to the computer system 2 from the construction machine 4 that performs works. The construction result data may be transmitted from the construction machine 4 to the computer system 2 at a fixed time of a day or periodically, for example. The construction result data acquisition unit 21 acquires the construction result data of the construction machine 4 (Step S140).

As described with reference to FIGS. 5 and 6, the construction machine 4 can detect an absolute position of the blade edge 440p that contacts a current landform. Based on an absolute position of a blade edge 400p, the construction machine 4 acquires position data indicating an absolute position in the Xg-axis direction, an absolute position in the Yg-axis direction, and an absolute position in the Zg-axis direction of each mesh point, and detects a current landform.

Figure 21:
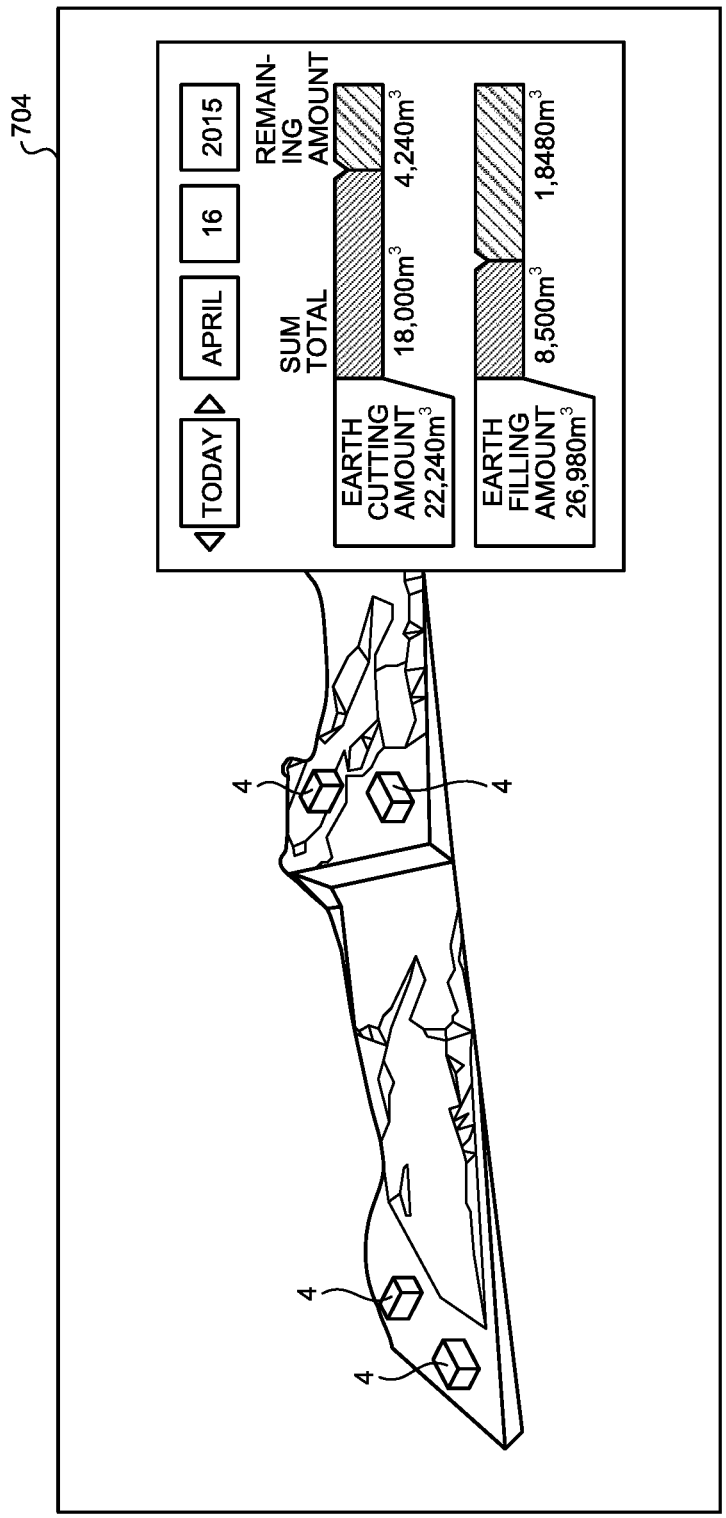
FIG. 21 is a diagram illustrating an output example of the output device according to the present embodiment.

Position data of each mesh point is output to the construction result data acquisition unit 21. The display device 704 of the mobile terminal 7 displays the construction result data (Step S150). FIG. 20 illustrates a display example of construction result data, and a two-dimensionally displayed example. FIG. 21 illustrates a three-dimensionally displayed example. In this manner, workers can visually check, in real time, a construction result (performance) of the day. In other words, the construction management system 1 can always "visualize" a daily construction plan and construction result.

An example of construction result data illustrated in FIG. 20 will be described. A construction progress status at a certain time point (e.g., Apr. 16, 2015) in a certain construction site is two-dimensionally displayed. In the construction site, earth filling is performed. A situation in which earth filling has been performed on a subgrade a plurality of times (into a plurality of layers) is visualized by using different colors or different patterns. In addition, an accumulation amount of filled earth is displayed as a numerical value (e.g., 462.0 m$^3$ in FIG. 20). In addition, if a button "before construction" is selected, colors and patterns in a state before construction are displayed, and if a button "construction plan" is selected, colors and patterns in a state of a construction plan are displayed. Through such two-dimensional display, the progress of construction can be visually recognized easily.

An example of construction result data illustrated in FIG. 21 will be described. A construction progress status at a certain time point (e.g., Apr. 16, 2015) in a certain construction site is three-dimensionally displayed. A current landform is three-dimensionally displayed using, for example, contrasting. The computer system 2 acquires, from each construction machine 4, absolute position data indicating an absolute position of an own vehicle that is obtained by the GPS receiver 406B provided in the construction machine 4, and visually displays a position of the construction machine 4 in the construction site. In addition, as past work results, a targeted earth cutting amount (for example, 22,240 m$^3$) and a targeted earth filling amount (for example, 26,980 m$^3$) are displayed as numerical values, and each accumulation amount (sum total) and remaining amounts with respect to the targets are displayed using numerical values and bar graphs. Through such three-dimensional display, the progress of construction can be visually recognized easily.

By a construction plan and a construction result being "visualized", so-called Plan Do Check Action (PDCA) that enables prompt execution of a series of works including construction planning before construction, management of construction progress during construction, and construction evaluation of construction can be rotated at high speed.

In addition, if there is a demand for a change of a design landform in the construction site 3, support is performed by the support center 14. In the support center 14, design landform data is modified, and the modified design landform data is reflected on process management.

In addition, design plan data and construction result data are accumulated in the result storage unit 45. In addition, current landform data, design landform data, mode data, original unit data, construction condition data, construction patterns, variation factor data, and transport condition data may be accumulated in the result storage unit 45. Taking advantage of these data accumulated in the result storage unit 45, the data can be utilized even after construction completion for maintenance/repair, future maintenance, a recovery work of areas suffering from a natural disaster, and the like, and can help a drastic reduction in work hours.

[Effects]

As described above, according to the present embodiment, based on construction amount data and original unit data, a construction plan and a construction cost required when construction is executed using the construction plan are calculated for each of a plurality of target construction periods, and the target construction periods and the construction costs that respectively correspond to the plurality of calculated construction plans are displayed on the display device 704. For each of the plurality of calculated construction plans, a target construction period and a construction cost are visualized in a compared state. A worker or a manager can therefore sensuously recognize a construction plan promptly. Thus, enhancement in productivity in a construction site can be achieved.

In addition, according to the present embodiment, detailed data of a construction plan corresponding to a target construction period selected according to an input signal of the input unit 50, among a plurality of target construction periods output to the display device 704 is displayed on the display device 704. A worker or a manager can thereby overview relationship between a target construction period and a construction cost for each of the plurality of calculated construction plans, and then, recognize the details of the selected construction plan.

In addition, according to the present embodiment, because relationship between a target construction period and a construction cost of each of a plurality of calculated construction plans is displayed on the display device 704 as a graph, a worker or a manager can sensuously overview relationship between each of the plurality of construction plans, and a target construction period and a construction cost, promptly. In addition, in the graph, construction plans respectively corresponding to the plurality of target construction periods are displayed using points. Thus, a worker or a manager can cause the display device 704 to display detailed data of a construction plan only by selecting a point, and recognize the detailed data.

In addition, according to the present embodiment, a construction plan is calculated based on a construction pattern of a work device. In the simulation of construction, by a construction pattern being input as a simulation parameter, simulation accuracy is enhanced, and construction plan data can be accurately calculated.

In addition, according to the present embodiment, a plurality of construction patterns is patterned in advance, and is registered in the construction pattern storage unit 43. Thus, only by manipulating the input unit 50 (the input device 703), a worker or a manager can select an arbitrary construction pattern from among the plurality of construction patterns registered in the construction pattern storage unit 43, and use the construction pattern in construction simulation.

In addition, according to the present embodiment, a construction plan is calculated based on transport condition data of the transporter vehicle 5. Thus, simulation accuracy of construction is further enhanced.

In addition, in the present embodiment, the construction plan data calculation unit 20 calculates process sheet data as construction plan data. Thus, a worker or a manager can visually recognize a process sheet displayed on the display device 704, promptly.

In addition, in the present embodiment, a construction plan calculated at the first time point (current time point, this time) and a construction plan calculated at the second time point (past time point, previous time) are simultaneously displayed on the display device 704. Thus, a worker or a manager can perform evaluation while comparing a construction simulation result performed in the previous time, and a construction simulation result performed in this time.

According to the present embodiment, because the construction management system 1 includes the current landform data acquisition unit 22, the design landform data acquisition unit 23, the original unit data acquisition unit 26, and the construction plan data calculation unit 20, the construction plan data calculation unit 20 can derive a construction range and a construction amount to be used in construction, based on current landform data and design landform data. Based on the derived construction range and construction amount, and original unit data, the construction management system 1 can formulate an optimum construction plan using the construction plan data calculation unit 20 of the computer system 2. Productivity in the construction site can be thereby enhanced, and labor shortage problems faced by the construction industry can be solved.

In the present embodiment, (1) an accurate construction plan can be created before construction and during construction, (2) a difference between a plan and a result (completed portion and completed volume) can be recognized in real time, (3) an optimum construction procedure and arrangement can be proposed, and (4) a construction plan can be calculated while predicting occurrence possibility of a variation factor. This can drastically enhance productivity in the construction site 3.

In addition, according to the present embodiment, the construction management system 1 can globally support the construction company 12 and works related to the construction of the construction site 3, throughout all the time including the time before construction, the time during construction, the time after construction, and the time of maintenance management.

In addition, according to the present embodiment, the camera 11 functioning as a detection device detects a current landform in a contactless manner, and wirelessly transmits current landform data to the current landform data acquisition unit 22 of the computer system 2. Measurement of the current landform and transmission of a measurement result can be thereby promptly performed.

In addition, according to the present embodiment, the camera 11 is mounted on the drone 10 being an unmanned air vehicle, and measures a current landform by aerially taking an image. This enables measurement to be ended in a short time.

In addition, according to the present embodiment, a specific condition of a work device that is indicated by original unit data includes at least one of a type and a vehicle rank of the work device, the number of work devices, and a management state of the work device. With this configuration, based on the original unit data, simulation accuracy of construction is enhanced, and an optimum construction plan can be formulated.

In addition, according to the present embodiment, a specific condition of a work device that is indicated by original unit data includes a work amount of the work device that can be executed per unit time. Construction simulation can be thereby highly-accurately performed for each unit time or for each process.

In addition, according to the present embodiment, the work device includes a work member that can change a current landform, and a work amount includes a size of the work member. Because the size of the work member is invariable data that can be known in advance, calculation burden of the work amount is reduced.

In addition, according to the present embodiment, the work device includes a transporter vehicle that transports sediment to a construction site, and the work amount includes an amount of sediment that can be transported per unit time. An amount of sediment that can be transported per unit time varies depending on travel conditions (travel route, travel distance, and travel speed) of the transporter vehicle 5 traveling on a general road, a traffic condition, a size of a vessel, and the like. By considering travel conditions of the transporter vehicle 5, a traffic condition, a size of a vessel, and the like, simulation accuracy of construction is enhanced, and optimum construction plan data is calculated. For example, if earth filling of sediment is required in the construction site 3, if it takes a long time for the transporter vehicle 5 on which sediment is loaded, to arrive at the construction site 3 due to a traffic condition, construction may stop. For preventing such a situation, construction plan data is calculated based on transport condition data of the transporter vehicle 5. This enhances productivity in the construction site 3.

In addition, according to the present embodiment, original unit data further includes a condition of a worker of a construction site. Productivity in the construction site 3 depends not only on a work device but also on a worker. Thus, by calculating a construction plan considering a condition of a worker as well, productivity in the construction site 3 is enhanced.

In addition, according to the present embodiment, a condition of a worker includes at least either one of the number of workers, and skill of the workers. With this configuration, simulation accuracy of construction is enhanced, and an optimum construction plan is formulated.

In addition, according to the present embodiment, the construction plan data calculation unit 20 cross-checks current landform data and design landform data, calculates construction range data indicating a construction range of a construction site, and soil amount data indicating an earth cutting amount or an earth filling amount of sediment required in the construction range, and calculates construction plan data based on the construction range data, the soil amount data, and the original unit data. Optimum construction plan data can be thereby calculated, and productivity in the construction site 3 can be enhanced.

In addition, according to the present embodiment, construction plan data includes at least one of work device data indicating a type, a vehicle rank, and the number of work devices used in the construction site, process sheet data indicating a process sheet of construction that uses the work device, and cost data indicating a cost required for construction. By the work device data, the process sheet data, and the cost data being calculated, actual construction is smoothly performed, and productivity is enhanced.

In addition, according to the present embodiment, the process sheet data includes at least one of flow data indicating a work procedure of construction, and work time data indicating a work time of each work of construction. The worker Ma can thereby smoothly execute works according to these data.

In addition, according to the present embodiment, the construction condition data acquisition unit 27 that acquires construction condition data indicating a construction condition in a construction site is included, and the construction plan data calculation unit 20 calculates construction plan data based on the construction condition data. By determining a construction condition being an initial condition or a constraint condition, solution can be promptly and appropriately obtained in construction simulation, and appropriate construction plan data can be calculated.

In addition, according to the present embodiment, the construction condition data includes at least one of a budget related to construction, a construction period, work content, a work procedure, a work time, and a site environment. By construction simulation being performed in a state in which a budget and a construction period are defined, a plurality of construction plans can be appropriately proposed within the ranges of the budget and the construction period. In addition, by work content, a work procedure, and a work time being predefined, appropriate construction plan data can be calculated under an appropriate work environment, and a targeted construction result can be obtained.

In addition, according to the present embodiment, a site environment includes at least either one of a landform of a construction site, and a size of the construction site. A time required for a work varies depending on a landform and a size of a construction site. Thus, by a landform and a size of the construction site being set, simulation accuracy of construction is enhanced.

In addition, according to the present embodiment, the variation factor data acquisition unit 29 that acquires variation factor data indicating a variation factor of a construction site is included, and the construction plan data calculation unit 20 calculates construction plan data based on the variation factor data. The variation factor data includes at least one of soil property data indicating a type and a state of sediment in the construction site, buried object data indicating a buried object buried under the construction site 3, and weather data of the construction site 3. A time required for a work varies depending on a soil property of the construction site. For example, between the case of heavy soil, the case of light soil, the case of argilliferous soil, and the case of sandy soil, times required for various works performed by the construction machine 4 that include an excavation work, an earth dozing work, an earth filling work, an earth cutting work, a land preparation work, a loading work, and the like vary. In addition, the easiness of travel (trafficability) of the transporter vehicle 5 varies depending on a soil property, and a time required for transport performed by the transporter vehicle 5 also varies. In addition, between the case of fine weather and the case of rainy weather, times required for works performed by a work device vary. By considering these variation factors attributed to natural phenomenon, simulation accuracy of construction is further enhanced, and appropriate construction plan data can be calculated.

In addition, according to the present embodiment, the support center 14 that accepts a change of a design landform is provided, the design landform data acquisition unit 23 acquires changed design landform data output from the support center 14, and the construction plan data calculation unit 20 recalculates construction plan data based on the changed design landform data. While reducing burden in the construction site 3 using the support center 14, the determination in the construction site 3 is accurately reflected on construction.

In addition, as described in the present embodiment, the remote control unit 32 that outputs a control signal for remotely manipulating a work device, based on the changed design landform data may be provided. With this configuration, burden on a driver of the work device is reduced, and informatization construction can be performed according to the changed design landform data.

In addition, according to the present embodiment, the construction result data acquisition unit 21 that acquires construction result data indicating a construction result of the construction site 3 is included, and the construction plan data calculation unit 20 recalculates construction plan data based on the construction result data. With this configuration, an optimum construction plan can be formulated in each case according to a progress status of construction.

In addition, according to the present embodiment, construction result data is displayed on the mobile terminal 7 functioning as an output device. A worker can thereby recognize a daily progress status of construction.

In addition, according to the present embodiment, a work device acquires construction result data, and the construction result data acquisition unit 21 wirelessly acquires construction result data 21 from the work device. With this configuration, a construction result can be promptly recognized in real time.

In addition, according to the present embodiment, the mode data acquisition unit 25 that acquires mode data indicating a prioritized item of construction is included, and the construction plan data calculation unit 20 calculates construction plan data based on the mode data. With this configuration, if a plurality of patterns of construction plans are proposed in the construction plan data calculation unit 20, a worker or a manager can acquire a construction plan compliant with a prioritized item, only by manipulating an input device, and transmitting the mode data to the mode data acquisition unit 25.

In addition, according to the present embodiment, the mode data includes at least either one of construction period prioritizing mode data that prioritizes a period of construction, and cost prioritizing mode data that prioritizes a cost of construction. By a construction period and a cost being set as prioritized items, a construction plan suitable for a budget and a target construction period can be selected.

In addition, in the present embodiment, original unit data is assumed to be a default value among a plurality of original unit data stored in the original unit data storage unit 41. A construction plan may be calculated based on original unit data input via an input device (e.g., input device 703). In addition, original unit data stored in the original unit data storage unit 41 may be changed or updated based on original unit data input via the input device. The same applies to the following embodiment.

In addition, in the present embodiment, current landform data is assumed to be acquired using, as a flight vehicle, the drone 10 including a power source. As a flight vehicle, a model plane may be used, or a balloon not including a power source may be used. A current landform may be detected using a camera mounted on the balloon. The same applies to the following embodiment.

[Another Embodiment of Construction Management System 1]

Figure 22:
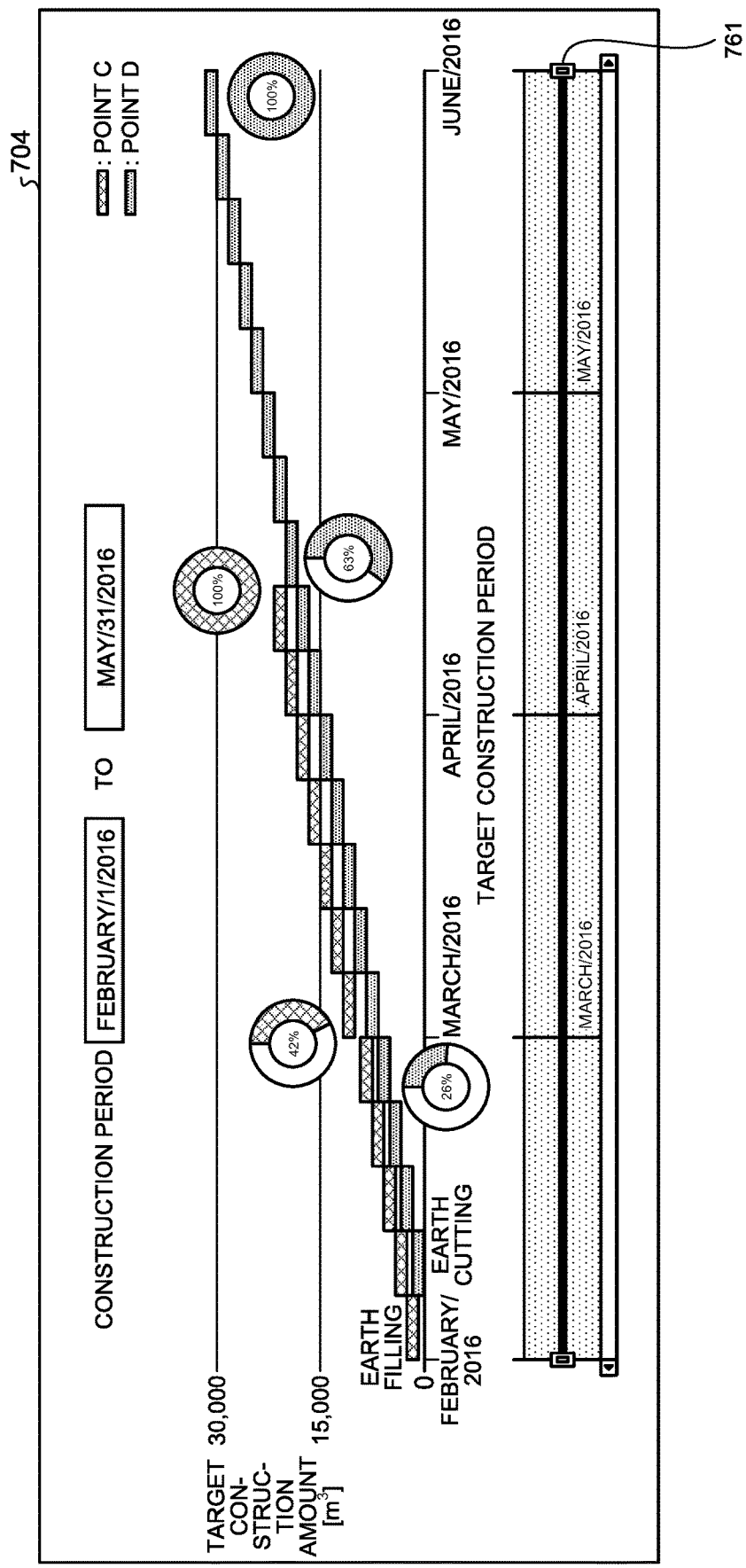
FIG. 22 is a diagram illustrating an output example of the output device according to the present embodiment.
Figure 23:
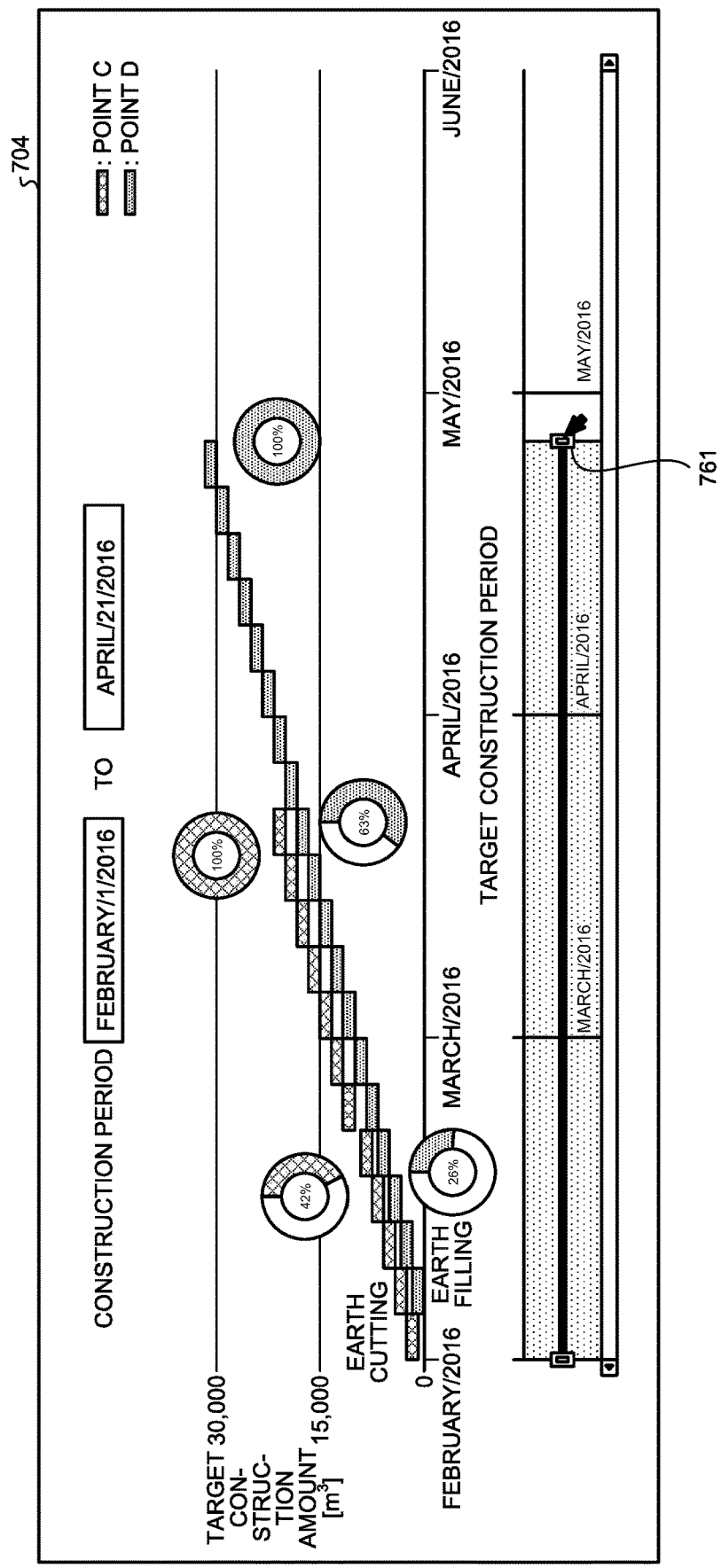
FIG. 23 is a diagram illustrating an output example of the output device according to the present embodiment.
Figure 24:
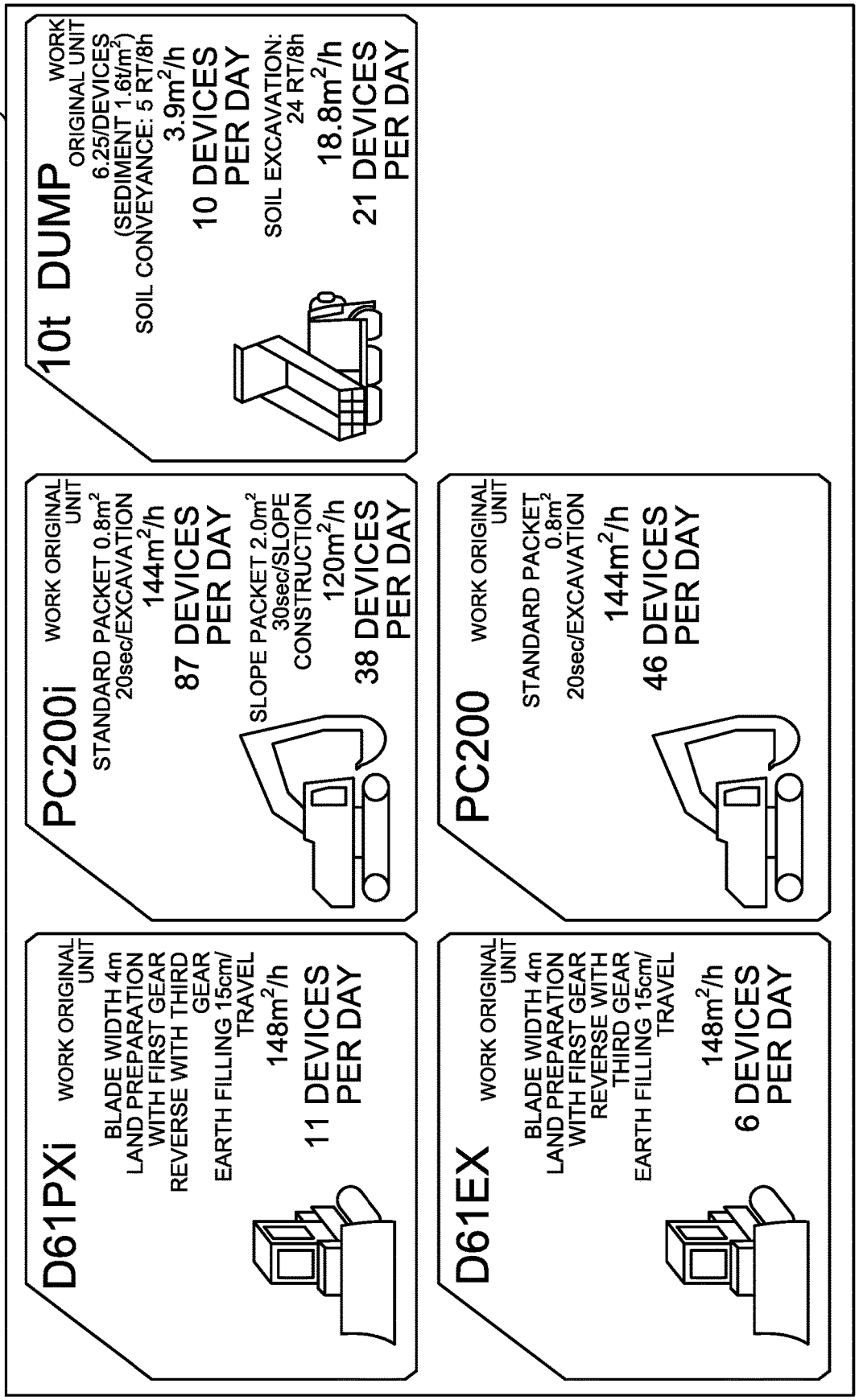
FIG. 24 is a diagram illustrating an output example of the output device according to the present embodiment.

Next, another embodiment of the construction management system 1 will be described with reference to FIGS. 22, 23, and 24. FIGS. 22, 23, and 24 are diagrams each illustrating a display example of the display device 704 according to the present embodiment. Also in the present embodiment, for simplifying the description, a display example of the display device 704 of the mobile terminal 7 will be described. Nevertheless, the same applies to the display device 804 of the information terminal 8, the display device 134 of the information terminal 13, the display device 154 of the information terminal 15, and the like.

Similarly to the aforementioned embodiment, the construction amount data calculation unit 24 calculates construction amount data of the construction site 3 based on a current landform and a design landform of the construction site 3. The original unit data acquisition unit 26 acquires original unit data indicating a specific condition of a work device that can construct the construction site 3. The construction amount is a collective term of an earth cutting amount and an earth filling amount in the construction range.

In the present embodiment, the construction plan data calculation unit 20 calculates necessary work device data indicating a work device necessary for completing construction of a construction site within a target construction period, based on construction amount data and original unit data. The necessary work device data includes at least one of a type of a work device necessary for completing construction within a target construction period, work ability of the work device, and the number of work devices.

From the construction amount data, a total construction amount being a total amount of construction amounts necessary in a target construction period from a construction start scheduled day to a construction completion target day is identified. The total construction amount includes a total earth cutting amount being a total amount of earth cutting amounts necessary in the target period, and a total earth filling amount being a total amount of earth filling amounts.

A type and work ability of a work device that can be procured to the construction site 3 is identified from original unit data. The work device includes at least either one of the construction machine 4 and the transporter vehicle 5. The work ability of the construction machine 4 includes an earth cutting amount and an earth filling amount that can be executed per unit time. The work ability of the transporter vehicle 5 includes a transport amount that can be executed per unit time.

Based on construction amount data including a total earth cutting amount and a total earth filling amount necessary for completing construction, and original unit data including work ability of a work device, the construction plan data calculation unit 20 can calculate necessary work device data including at least one of a type of a work device, work ability of the work device, and the number of work devices that are necessary in a target construction period for completing construction within the target construction period from a construction start scheduled day to a construction end target day.

In the present embodiment, a plurality of target construction periods is set. The construction plan data calculation unit 20 calculates necessary work device data for each of the plurality of target construction periods. For example, first necessary work device data necessary for completing construction of a construction site within a first target construction period is calculated, and second necessary work device data necessary for completing construction of the construction site within a second target construction period being different from the first target construction period is calculated. In other words, the construction plan data calculation unit 20 simulates, for each of the plurality of different target construction periods, a type of a work device, the number of work devices, and the like that are necessary for completing construction.

In addition, in a target construction period, a construction day (construction scheduled day) on which construction is to be executed is set. The construction plan data calculation unit 20 can calculate a target construction amount (target earth cutting amount and target earth filling amount) in each construction day by, for example, dividing a total construction amount (total earth cutting amount and total earth filling amount) necessary in a target period, by the number of construction days. In addition, generally, a plurality of construction days is set within the target construction period. Nevertheless, one day may be set as a construction day.

In addition, a work device may fail to be procured in a certain construction day, or work efficiency of construction may decline due to weather. In these cases, target construction amounts may fail to become constant among the plurality of construction days. Based on construction amount data, original unit data including a procurable status of a work device, and variation factor data including weather data and the like, the construction plan data calculation unit 20 can simulate a target construction amount of each construction day more accurately.

FIG. 22 is a diagram illustrating a display example of the display device 704 that displays relationship between a target construction period and a target construction amount that is obtainable when the target construction period is the first target construction period. As illustrated in FIG. 22, the construction plan data output unit 31 causes the display device 704 to display relationship between the target construction period, and target construction amount data in a construction day in the target construction period.

As illustrated in FIG. 22, the construction plan data output unit 31 causes the display device 704 to display a graph in which a horizontal axis indicates a target construction period, and a vertical axis indicates a target construction amount.

FIG. 22 illustrates an example of a simulation result in which, as the first target construction period, a construction start scheduled day is set to "Feb. 1, 2016", and a construction end target day is set to "May 31, 2016". In other words, in the example illustrated in FIG. 22, the first target construction period is a period from "Feb. 1, 2016" to "May 31, 2016".

A plurality of construction days is set in a target construction period from a construction start scheduled day to a construction end target day. A target construction amount (target earth cutting amount and target earth filling amount) is calculated for each of the plurality of construction days. Target construction amount data (target earth cutting amount data and target earth filling amount data) indicating a target construction amount in a construction day is displayed on the display device 704.

The construction plan data output unit 31 causes the display device 704 to display a point indicating target construction amount data of each of the plurality of construction days in the target construction period. As illustrated in FIG. 22, display is performed on the display device 704 using points in which a plurality of target construction amount data is associated with construction days. The target construction amount data includes target earth cutting amount data and target earth filling amount data. In FIG. 22, a point C indicates target earth cutting amount data of each construction day. A point D indicates target earth filling amount data of each construction day.

In the present embodiment, target construction amount data displayed for each construction day indicates an accumulation value of target construction amounts. For example, if a target earth cutting amount of the first construction day from a construction start is A [m$^3$], and a target earth cutting amount of the second construction day is B [m$^3$], the point C corresponding to the first construction day is displayed so as to indicate a target earth cutting amount A [m$^3$], and the point C corresponding to the second construction day is displayed so as to indicate a target earth cutting amount (A+B) [m$^3$]. Thus, in the example illustrated in FIG. 22, in accordance with the number of days elapsed from a construction start scheduled day, the target earth cutting amount and the target earth filling amount gradually increase.

In addition, target construction amount data displayed on the display device 704 needs not be an accumulation value of target construction amounts, and may be a target construction amount of each construction day. In this case, for example, the point C corresponding to the first construction day is displayed so as to indicate a target earth cutting amount A [m$^3$], and the point C corresponding to the second construction day is displayed so as to indicate a target earth cutting amount B [m$^3$]. In addition, a graph indicating relationship between a plurality of construction days and target construction amounts respectively corresponding to the plurality of construction days may be a bar graph.

In addition, the construction plan data output unit 31 causes the display device 704 to display image data indicating a progress rate of construction. For example, if the worker Ma selects a specific point from among a plurality of points displayed on the display device 704, by manipulating the input device 703, a progress rate of construction in a construction day corresponding to the selected point D is displayed as popup by a circle graph. In the example illustrated in FIG. 22, by selecting the point C in "Mar. 1, 2016", an expected value (42[%]) of a progress rate of an earth cutting work in the construction day (Mar. 1, 2016), and a circle graph indicating the progress rate are displayed as popup. Similarly, by selecting the point D in "Mar. 1, 2016", an expected value (26[%]) of a progress rate of an earth filling work in the construction day (Mar. 1, 2016), and a circle graph indicating the progress rate are displayed as popup, and by selecting the point D in "Apr. 10, 2016", an expected value (63[%]) of a progress rate of an earth filling work in the construction day (Apr. 10, 2016), and a circle graph indicating the progress rate are displayed as popup.

In addition, image data indicating a progress rate needs not be a circle graph, and arbitrary image data can be used. In addition, only numerical data of an expected value of a progress rate may be displayed on the display device 704, and the display may be performed on the display device 704 in a display form using balloon display.

A construction day corresponding to the point C at which an expected value of a progress rate is 100[%] is an end target day of the earth cutting work. A construction day corresponding to the point D at which an expected value of a progress rate is 100[%] is an end target day of the earth filling work. In the example illustrated in FIG. 22, a target construction period of the earth filling work is longer than a target construction period of the earth cutting work. The end target day of the earth filling work is a construction end target day, and the completion of the earth filling work completes construction of the construction site 3.

FIG. 23 is a diagram illustrating a display example of the display device 704 that displays relationship between a target construction period and a target construction amount that is obtainable when the target construction period is a second target construction period being different from the first target construction period. Similarly to the graph illustrated in FIG. 22, in a graph illustrated in FIG. 23, a horizontal axis indicates a target construction period, and a vertical axis indicates a target construction amount.

FIG. 23 illustrates an example of a simulation result in which, as the second target construction period, a construction start scheduled day is set to "Feb. 1, 2016", and a construction end target day is set to "Apr. 21, 2016". In other words, in the example illustrated in FIG. 23, the second target construction period is a period from "Feb. 1, 2016" to "Apr. 21, 2016".

As illustrated in FIGS. 22 and 23, the construction plan data output unit 31 displays, as a graphical user interface (GUI), a slide portion on the display screen of the display device 704. In the present embodiment, the slide portion includes a slider bar 761 for changing a target construction period indicated by the horizontal axis. By the slider bar 761 being manipulated, the target construction period is changed, and a target construction amount of each construction day varies in accordance with the change in target construction period.

For example, if the slider bar 761 is at a position illustrated in FIG. 22, as mentioned above, relationship between the first target construction period from "Feb. 1, 2016" to "May 31, 2016", and target construction amount data in each construction day in the first target construction period is displayed on the display device 704. If the slider bar 761 is at a position illustrated in FIG. 23, relationship between the second target construction period from "Feb. 1, 2016" to "Apr. 21, 2016", and target construction amount data in each construction day in the second target construction period is displayed on the display device 704.

In this manner, in the present embodiment, if the slider bar 761 is moved to the right, the target construction period becomes longer, and a graph indicating relationship between the long target construction period and a target construction amount is displayed on the display device 704. If the slider bar 761 is moved to the left, the target construction period becomes shorter, and a graph indicating relationship between the short target construction period and a target construction amount is displayed on the display device 704.

In addition, the slider bar 761 moves by the input device 703 of the mobile terminal 7 being manipulated. If the input device 703 includes a mouse, the slider bar is dragged and slid by the manipulation of the mouse. If the display device 704 includes a touch panel, the slider bar is dragged and slid by a finger or the like of the worker Ma.

Each point illustrated in FIG. 22 and FIG. 23 includes necessary work device data calculated by the construction plan data calculation unit 20. If the worker Ma selects a specific point from among a plurality of points displayed on the display device 704, by manipulating the input device 703, necessary work device data corresponding to the selected point is displayed on the display device 704.

For example, if it is desired that "a type and the number of work devices necessary for completing construction within the first target construction period are desired to be known", the worker Ma manipulates the slider bar 761, and brings a display state of the display device 704 into a display state illustrated in FIG. 22. After that, the worker Ma manipulates the operating device 703 while viewing the display screen of the display device 704 illustrated in FIG. 22, and selects, from among a plurality of points displayed on the display device 704, a point corresponding to the construction end target day (May 31, 2016) being the last day of the target construction period. If the input device 703 includes a mouse, the worker Ma puts a cursor of the mouse on the point corresponding to the construction end target day, and clicks the point. If the input device 703 includes a touch panel, the worker Ma taps the point corresponding to the construction end target day that is displayed on the display screen.

If the point corresponding to the construction end target day is manipulated, the construction plan data output unit 31 causes the display device 704 to display necessary work device data corresponding to the first target construction period.

In addition, if it is desired that "a type and the number of work devices necessary for completing construction within the second target construction period are desired to be known", the worker Ma manipulates the slider bar 761, and brings a display state of the display device 704 into a display state illustrated in FIG. 23. After that, the worker Ma manipulates the operating device 703 while viewing the display screen of the display device 704 illustrated in FIG. 23, and selects, from among a plurality of points displayed on the display device 704, a point corresponding to the construction end target day (Apr. 21, 2016) being the last day of the target construction period. The worker Ma manipulates, via the input device 703, the point corresponding to the construction end target day that is displayed on the display screen of the display device 704.

If the point corresponding to the construction end target day is manipulated, the construction plan data output unit 31 causes the display device 704 to display necessary work device data corresponding to the second target construction period.

In addition, in the present embodiment, for simplifying the description, a display example of the first target construction period and a display example of the second target construction period have been described. The construction plan data calculation unit 20 can calculate not only necessary work device data of two target construction periods, but also necessary work device data of each of a plurality of target construction periods being an arbitrary number equal to or lager than 3. The construction plan data output unit 31 can cause the display device 704 to display target construction amount data and necessary work device data corresponding to a plurality of target construction periods.

FIG. 24 is a diagram illustrating an example of necessary work device data displayed on the display device 704. If a point corresponding to a construction end target day is manipulated on a display screen of the display device 704 as described with reference to FIG. 22 or 23, the display screen transitions to a display screen illustrated in FIG. 24. In other words, if a point corresponding to a construction end target day is manipulated on a display screen indicating relationship between a certain target construction period and target construction amount data in a construction day in the target construction period, as illustrated in FIG. 24, necessary work device data indicating work devices necessary for completing construction of a construction site within the target construction period is displayed on the display device 704.

FIG. 24 illustrates an example in which, as necessary work device data, data on a first bulldozer (D61PXi), a data on a second bulldozer (D61EX), a first excavator (PC200i), a second excavator (PC200), and a first transporter vehicle (10t dump) are calculated. In FIG. 24, "devices per day" indicate the number of necessary work devices in a target construction period from a construction start scheduled day to a construction end target day. For example, "11 devices per day" for the first bulldozer (D61PXi) means that a work amount corresponding to 11 devices is necessary in the target construction period. For example, when only one first bulldozer can be procured in the target construction period, this means that the one first bulldozer needs to operate for 11 days in the target construction period. When only two first bulldozers can be procured in the target construction period, this means that each of the two first bulldozers needs to operate for 5.5 days in the target construction period. The same applies to the second bulldozer, the first excavator, the second excavator, and the first transporter vehicle. In addition, as necessary work device data, not only the number of work devices (devices per day), but also original unit data such as a size of a work member is displayed.

Necessary work device data calculated by the construction plan data calculation unit 20 varies according to a target construction period. If a target construction period is short, for completing construction within the short target construction period, for example, many "devices per day" become necessary, many types of work devices become necessary, or work devices with high work ability become necessary.

The construction plan data output unit 31 can cause the display device 704 to display target construction amount data and necessary work device data corresponding to a plurality of target construction periods. The construction plan data output unit 31 can cause the display device 704 to display necessary work device data corresponding to a target construction period designated according to an input signal generated by the input device 703 being manipulated, among a plurality of target construction periods.

In addition, among a plurality of points as described with reference to FIG. 22 or 23, if a point corresponding to a halfway construction day (for example, Mar. 15, 2016) of the target construction period is selected via the input device 703, the construction plan data output unit 31 can cause the display device 704 to display data related to work devices necessary for executing construction with target construction amounts of construction days up to the construction day corresponding to the selected point. In other words, for example, as illustrated in FIG. 22, a point corresponding to Mar. 15, 2016, for example, is selected when a target construction period is May 31, 2016, work devices necessary for construction in a period from Feb. 1, 2016 (construction start scheduled day) to Mar. 15, 2016 are calculated by the construction plan data calculation unit 20 so that an accumulation value of target construction amounts in Mar. 15, 2016 is achieved. The construction plan data output unit 31 causes the display device 704 to display data indicating the calculated work devices.

In addition, in the graph illustrated in FIG. 22 or 23, the horizontal axis may indicate a target construction amount, and the vertical axis may indicate a target construction period.

As described above, according to the present embodiment, because relationship between a target construction period and target construction amount data in a construction day of the target construction period is displayed on the display device 704, a worker or a manager can promptly and appropriately perform determination as to how much construction amount is required for construction in each construction day, and how much construction needs to be progressed by each construction day, by viewing the data displayed on the display device 704.

In addition, in the present embodiment, necessary work device data indicating work devices necessary for completing construction of a construction site within a target construction period is automatically calculated based on construction amount data and original unit data, and is displayed on the display device 704. Processing of procuring necessary work devices and operators is therefore smoothly and promptly performed.

In addition, in the present embodiment, necessary work device data is calculated for each of a plurality of target construction periods. Thus, if a target construction period is determined by a worker or a manager, necessary work device data corresponding to the target construction period is displayed on the display device 704. Processing of procuring necessary work devices and operators is therefore smoothly and promptly performed.

In the present embodiment, a target construction period to be displayed can be easily changed by the manipulation of the slider bar 761, and only by selecting a point displayed in the changed target construction period, necessary work device data corresponding to the target construction period is automatically displayed on the display device 704. By these graphical user interfaces being provided, a worker or a manager can smoothly acquire necessary work device data corresponding to a target construction period.

In addition, in the present embodiment, not only necessary work device data with respect to a total construction amount, but also data indicating work devices necessary up to a halfway stage of a target construction period is displayed. Thus, a worker or a manager can appropriately procure work devices and operators while considering a progress status of construction.

[Modified Example of Acquisition of Current Landform Data]

As described with reference to FIGS. 2 to 6, the construction machine 4 includes the vehicle main body 400, and the work member 440 that relatively moves with respect to the vehicle main body 400. The work member 440 includes the blade edge 400p that contacts a current landform. The construction machine 4 includes the processor 401 (the blade control device 401A, the bucket control device 401B) that detects a current landform based on an absolute position of the blade edge 440p. The absolute position of the vehicle main body 400 is detected by the GPS receiver 406. The construction machine 4 includes the detection device 420 (420A, 420B) that detects a relative position of the blade edge 440p with respect to the vehicle main body 400. Based on the absolute position of the vehicle main body 400, and a detection result of a detection position 420, an absolute position of the blade edge 440p is obtained. The construction site 3 is constructed by the blade edge 440p, and a current landform is formed. In other words, by identifying the absolute position of the blade edge 440p, an absolute position of a mesh point provided on a surface of the current landform is identified. Thus, the processor 401 can detect a current landform by detecting the absolute position of the blade edge 440p.

The processor 401 of the construction machine 4 wirelessly transmits current landform data to the computer system 2. The current landform data acquisition unit 22 of the computer system 2 wirelessly acquires the current landform data from the construction machine 4.

In this manner, the acquisition of current landform data is not limited to the acquisition using a flight vehicle such as the drone 10, and current landform data may be acquired using the construction machine 4. For example, if an obstacle such as a tree exists in the construction site 3 and it is difficult to cause the drone 10 to fly, current landform data can be smoothly acquired by using the construction machine 4.

In addition, also in the case of executing a dredge work of excavating sediment on a sea bed, a river bed, or the like, a current landform of the sea bed or the river bed can be detected by acquiring trajectory data of the blade edge 440p of the construction machine 4. By the current landform data of the sea bed or the river bed that has been detected using the blade edge 440p, being transmitted to the computer system 2, the current landform data acquisition unit 22 can acquire the current landform data of the sea bed or the river bed. The computer system 2 can cause the mobile terminal 7, the information terminal 8, or the like to display the current landform data of the sea bed or the river bed. In addition, the computer system 2 can cause the mobile terminal 7, the information terminal 8, or the like to display the current landform data of the sea bed or the river bed, and design landform data of the sea bed or the river bed. With this configuration, even in a construction site in which a flight vehicle such as the drone 10 cannot be used, a worker or a manager can check current landform data and design landform data.

In addition, three-dimensional current landform data may be detected by a stereo camera mounted on the construction machine 4. With the stereo camera mounted on the construction machine 4, current landform data being a result constructed by the construction machine 4 itself can be surely acquired. In addition, current landform data can be surely acquired even in a situation in which it is difficult to cause the drone 10 to fly as mentioned above, and even in a region in which current landform data has failed to be acquired by the drone 10. In this manner, the acquisition of current landform data may be performed using both the drone 10 and the stereo camera. In addition, the stereo camera may be the one that is installed in a construction site, and can move.

Alternatively, a three-dimensional laser scanner device that optically acquires current landform data by emitting laser light being detection light, onto a surface of a current landform may be used for acquisition of three-dimensional current landform data. In addition, a triangulation device may be used for acquisition of three-dimensional current landform data.

In addition, in the aforementioned embodiment, the description has been mainly given of an example in which the output device (output device 704, etc.) is a display device. The output device may be a printing device. Output performed by the output device includes printing (print out) performed by the printing device. In other words, each display data (image data and character data) displayed on the display device 704 that has been described in the aforementioned embodiment may be output as a printed matter.

In addition, in the aforementioned embodiment, the description has been given of an example in which the construction machine 4 is an ICT construction machine. If current landform data is acquired in each time using a first detection device such as a drone, a stereo camera, and a three-dimensional laser scanner device, a construction plan (construction plan data) can be presented to a manager or a worker by a construction management system that uses, instead of an ICT construction machine, a normal construction machine not equipped with a device that enables informatization construction.

In addition, in the aforementioned embodiment, design landform data is generated by the information terminal 13 of the construction company 12 or the information terminal 15 of the support center 14, and the design landform data acquisition unit 23 of the computer system 2 acquires the design landform data from the construction company 12 or the support center 14. The design landform data may be generated by the computer system 2 of the construction management system 1. In this case, in place of the design landform data acquisition unit 23 of the computer system 2, or together with the design landform data acquisition unit 23, the computer system 2 may include a design landform data generation unit that generates design landform data.

In addition, in the aforementioned embodiment, design landform data created in the construction company 12 or the support center 14 is acquired by the computer system 2. Design landform data created in the construction company 12 or the support center 14 may be directly transmitted to the construction machine 4 not via the computer system 2 but via the input-output interface circuit 405 of the construction machine 4. In addition, design landform data may be created in the processor 401 of the construction machine 4 instead of being created in the construction company 12 or the support center 14.

REFERENCE SIGNS LIST

1 CONSTRUCTION MANAGEMENT SYSTEM
2 COMPUTER SYSTEM
3 CONSTRUCTION SITE
4 CONSTRUCTION MACHINE
4A EXCAVATOR
4B BULLDOZER
5 TRANSPORTER VEHICLE
6 GPS SATELLITE
7 MOBILE TERMINAL
8 INFORMATION TERMINAL
9 SITE OFFICE
10 DRONE
11 CAMERA
12 CONSTRUCTION COMPANY
13 INFORMATION TERMINAL
14 SUPPORT CENTER
15 INFORMATION TERMINAL
20 CONSTRUCTION PLAN DATA CALCULATION UNIT
21 CONSTRUCTION RESULT DATA ACQUISITION UNIT
21 CURRENT LANDFORM DATA ACQUISITION UNIT
22 DESIGN LANDFORM DATA ACQUISITION UNIT
23 CONSTRUCTION AMOUNT DATA CALCULATION UNIT
24 MODE DATA ACQUISITION UNIT
26 ORIGINAL UNIT DATA ACQUISITION UNIT
27 CONSTRUCTION CONDITION DATA ACQUISITION UNIT
28 CONSTRUCTION PATTERN ACQUISITION UNIT
29 VARIATION FACTOR DATA ACQUISITION UNIT
30 TRANSPORT CONDITION DATA ACQUISITION UNIT
31 CONSTRUCTION PLAN DATA OUTPUT UNIT
32 REMOTE CONTROL UNIT
41 ORIGINAL UNIT DATA STORAGE UNIT
42 CONSTRUCTION CONDITION DATA STORAGE UNIT
43 CONSTRUCTION PATTERN STORAGE UNIT
44 VARIATION FACTOR DATA STORAGE UNIT
45 RESULT STORAGE UNIT
50 INPUT UNIT
Ma WORKER
Mb WORKER
Mc WORKER

The invention claimed is:

1. A construction management system comprising:
a construction amount data calculation unit configured to calculate, based on a current landform and a design landform of a construction site, construction amount data of the construction site;
an original unit data acquisition unit configured to acquire original unit data indicating a specific condition of a work device that constructs the construction site;
a construction plan data calculation unit configured to calculate, based on the construction amount data and the original unit data, a construction plan corresponding to a target construction period, and a construction cost required when construction is executed using the construction plan;
a construction plan data output unit configured to cause an output device to output the construction cost corresponding to the target construction period to at least the construction site;
a construction result data acquisition unit configured to acquire construction result data from the construction site based on said output, indicating a construction result of the construction site;
wherein design landform data is transmitted by the construction plan data output unit to a work machine to control a work member of the work machine based on the design landform data corresponding to a target shape of an excavation target of the construction site such that the work member is moved in accordance with the landform;
wherein the construction result data is based on absolute position information of the work member of the work machine received from the work machine during operation of the work machine at the construction site; and
a computer system including a processor configured to process functions at least of the construction amount data calculation unit, the original unit data acquisition unit, the construction plan data calculation unit, the construction plan data output unit, and the construction result data acquisition unit;

wherein the construction result data indicating a result of construction is executed by the construction machine, which detects the current landform, compares the current landform with the design landform being a target shape, and acquires construction result data of itself indicating how much work has progressed with respect to the design landform, the construction result data acquisition unit wirelessly acquiring the construction result data from the construction machine.

2. The construction management system according to claim 1, wherein the construction plan data calculation unit is configured to calculate the construction cost for each of a plurality of the target construction periods.

3. The construction management system according to claim 1, wherein the construction plan data output unit is configured to cause the output device to output the target construction periods and the construction costs that respectively correspond to a plurality of the calculated construction plans.

4. The construction management system according to claim 1, wherein the construction plan data output unit is configured to cause the output device to output the plurality of target construction periods in association with the construction costs, and is configured to cause the output device to output the construction plan corresponding to a target construction period selected according to an input signal of an input unit, among the plurality of target construction periods output to the output device.

5. The construction management system according to claim 1, wherein the construction plan data output unit is configured to cause the output device to output, in graph in which a first axis indicating the target construction period, and a second axis indicating the construction cost are defined, points indicating the construction plans respectively corresponding to the plurality of target construction periods, and is configured to cause the output device to output the construction plan corresponding to a selected point among a plurality of the points.

6. The construction management system according to claim 1, comprising a construction pattern acquisition unit configured to acquire a construction pattern of the work device, wherein the construction plan data calculation unit is configured to calculate the construction plan based on the construction pattern.

7. The construction management system according to claim 6, comprising a construction pattern storage unit in which a plurality of the construction patterns is stored, wherein the construction pattern acquisition unit is configured to acquire, from among the plurality of construction patterns stored in the construction pattern storage unit, a construction pattern selected according to an input signal of an input unit.

8. The construction management system according to claim 1, wherein the work device includes a transporter vehicle configured to transport sediment, wherein a transport condition data acquisition unit configured to acquire transport condition data of the transporter vehicle is further included, and wherein the construction plan data calculation unit is configured to calculate the construction plan based on the transport condition data.

9. The construction management system according to claim 1, wherein the construction plan includes a process sheet of the construction.

10. The construction management system according to claim 1, wherein the construction plan data output unit is configured to cause the output device to simultaneously output a construction plan calculated by the construction plan data calculation unit at a first time point, and a construction plan calculated at a second time point earlier than the first time point.

11. A construction management system comprising:

a construction amount data calculation unit configured to calculate, based on a current landform and a design landform of a construction site, construction amount data of the construction site;

an original unit data acquisition unit configured to acquire original unit data indicating a specific condition of a work device that constructs the construction site;

a construction plan data calculation unit configured to calculate, based on the construction amount data and the original unit data, necessary work device data indicating a work device necessary for completing construction of the construction site within a target construction period;

a construction plan data output unit configured to cause an output device to output the target construction period and target construction amount data in a construction day of the target construction period to at least the construction site;

a construction result data acquisition unit configured to acquire construction result data from the construction site based on said output, indicating a construction result of the construction site;

a computer system including a processor configured to process functions at least of the construction amount data calculation unit, the original unit data acquisition unit, the construction plan data calculation unit, the construction plan data output unit, and the construction result data acquisition unit;

wherein design landform data is transmitted by the construction plan data output unit to a work machine to control a work member of the work machine based on the design landform data corresponding to a target shape of an excavation target of the construction site such that the work member is moved in accordance with the landform;

wherein the construction result data is based on absolute position information of the work member of the work machine received from the work machine during operation of the work machine at the construction site; and wherein the construction result data indicating a result of construction is executed by the construction machine, which detects the current landform, compares the current landform with the design landform being a target shape, and acquires construction result data of itself indicating how much work has progressed with respect to the design landform, the construction result data acquisition unit wirelessly acquiring the construction result data from the construction machine.

12. The construction management system according to claim 11, wherein the construction plan data output unit is configured to cause the output device to output the necessary work device data corresponding to the target construction period.

13. The construction management system according to claim 11, wherein the construction plan data calculation unit is configured to calculate the necessary work device data for each of a plurality of target construction periods, and
wherein the construction plan data output unit is configured to cause the output device to output the target construction amount data and the necessary work device data corresponding to the plurality of target construction periods.

14. The construction management system according to claim 13, wherein the construction plan data output unit is configured to cause the output device to output the necessary work device data corresponding to a target construction period designated according to an input signal of an input unit, among the plurality of target construction periods.

15. The construction management system according to claim 11,
wherein the construction plan data output unit is configured to cause the output device to output a graph in which a first axis indicates the target construction period, and a second axis indicates the target construction amount, and is configured to cause the output device to output a slide portion for changing the target construction period indicated by the first axis.

16. The construction management system according to claim 12,
wherein the construction plan data output unit is configured to cause the output device to output a point indicating the target construction amount data of each of the construction day of the target construction period, and is configured to cause the output device to output the work device necessary for executing the construction with target construction amounts of construction days up to the construction day corresponding to a selected point among a plurality of the points.

17. A construction management method comprising:
calculating, based on a current landform and a design landform of a construction site, construction amount data of the construction site;
calculating, based on the construction amount data, and original unit data indicating a specific condition of a work device that constructs the construction site, a construction plan corresponding to a target construction period, and a construction cost required when construction is executed using the construction plan;
causing an output device to output the construction cost corresponding to the target construction period to at least the construction site;
causing a construction result data acquisition unit to acquire construction result data from the construction site based on said output, indicating a construction result of the construction site;
wherein design landform data is transmitted by the construction plan data output unit to a work machine to control a work member of the work machine based on the design landform data corresponding to a target shape of an excavation target of the construction site such that the work member is moved in accordance with the landform;
wherein the construction result data is based on absolute position information of the work member of the work machine received from the work machine during operation of the work machine at the construction site; and
wherein the construction result data indicating a result of construction is executed by the construction machine, which detects the current landform, compares the current landform with the design landform being a target shape, and acquires construction result data of itself indicating how much work has progressed with respect to the design landform, the construction result data acquisition unit wirelessly acquiring the construction result data from the construction machine.

18. A construction management method comprising:
calculating, based on a current landform and a design landform of a construction site, construction amount data of the construction site;
calculating, based on the construction amount data, and original unit data indicating a specific condition of a work device that constructs the construction site, necessary work device data indicating a work device necessary for completing construction of the construction site within a target construction period;
causing an output device to output the target construction period and target construction amount data in a construction day of the target construction period to at least the construction site; and
causing a construction result data acquisition unit to acquire construction result data from the construction site based on said output, indicating a construction result of the construction site;
wherein design landform data is transmitted by the construction plan data output unit to a work machine to control a work member of the work machine based on the design landform data corresponding to a target shape of an excavation target of the construction site such that the work member is moved in accordance with the landform;
wherein the construction result data is based on absolute position information of the work member of the work machine received from the work machine during operation of the work machine at the construction site; and
wherein the construction result data indicating a result of construction is executed by the construction machine, which detects the current landform, compares the current landform with the design landform being a target shape, and acquires construction result data of itself indicating how much work has progressed with respect to the design landform, the construction result data acquisition unit wirelessly acquiring the construction result data from the construction machine.

* * * * *